United States Patent [19]
Yamamoto et al.

[11] Patent Number: 5,426,669
[45] Date of Patent: Jun. 20, 1995

[54] QUADRATURE DEMODULATOR

[75] Inventors: Yuuri Yamamoto, Yokohama; Kenichi Takahashi, Kawasaki; Hiroshi Ohnishi, Tokyo; Yoshinori Kunieda, Kawasaki; Naoki Matsubara, Tokyo, all of Japan

[73] Assignee: Matsushita Electric Industrial Co., Ltd., Osaka, Japan

[21] Appl. No.: 77,586

[22] Filed: Jun. 17, 1993

[30] Foreign Application Priority Data

| Jun. 19, 1992 | [JP] | Japan | 4-160662 |
| Jun. 26, 1992 | [JP] | Japan | 4-168837 |
| Jan. 20, 1993 | [JP] | Japan | 5-007247 |
| Feb. 5, 1993 | [JP] | Japan | 5-018378 |

[51] Int. Cl.$^6$ ............... H03D 3/18; H04L 27/06
[52] U.S. Cl. ............... 375/82; 375/340; 375/324; 329/310
[58] Field of Search ............... 375/94, 80, 81, 82, 375/83, 39, 78, 75, 84–87; 329/304, 305, 306, 310

[56] References Cited

U.S. PATENT DOCUMENTS

| 4,246,654 | 1/1981 | Malm ............... 375/83 |
| 5,005,186 | 4/1991 | Aono et al. ............... 375/39 |
| 5,170,415 | 12/1992 | Yoshida et al. ............... 375/80 |
| 5,239,273 | 8/1993 | Hedstrom et al. ............... 375/80 |

Primary Examiner—Stephen Chin
Assistant Examiner—Hai H. Phan
Attorney, Agent, or Firm—Lowe, Price, LeBlanc & Becker

[57] ABSTRACT

A quadrature demodulator includes a device for generating first and second reference signals having a quadrature relation with each other. A first demodulating device serves to compare phases of the first reference signal and an input modulated signal to demodulate the input modulated signal into a first binary baseband signal. A second demodulating device serves to compare phases of the second reference signal and the input modulated signal to demodulate the input modulated signal into a second binary baseband signal having a quadrature relation with the first baseband signal. A first counting device operates to count pulses of a clock signal in response to the first baseband signal. A second counting device operates to count pulses of the clock signal in response to the second baseband signal. An address signal is generated in response to the output signals of the first and second counting devices. Data representative of an absolute phase of the input modulated signal is generated in response to the address signal.

6 Claims, 22 Drawing Sheets

GATE SIGNAL

QUADRATURE DEMODULATOR

BACKGROUND OF THE INVENTION

1. Field of the Invention

This invention relates to a quadrature demodulator usable in a receiver for a digital phase modulation signal such as a QPSK (quaternary phase shift keyed) signal, a DQPSK (differential quaternary phase shift keyed) signal, or a $\pi/4$-shift QPSK signal.

2. Description of the Prior Art

Some of prior art quadrature demodulators in receivers for digital phase modulation signals include digital phase comparators which output a pair of signals representing transmitted data. The output signals of the digital phase comparators are processed by analog circuits including low pass filters and sapling devices. Output signals of the analog circuits are converted into corresponding digital signals, from which the transmitted data is recovered.

For high reliability and accuracy in a data demodulating process, it is generally desirable to replace an analog circuit by a digital circuit.

SUMMARY OF THE INVENTION

It is an object of this invention to provide an improved quadrature demodulator.

A first aspect of this invention provides a quadrature demodulator comprising means for generating first and second reference signals having a quadrature relation with each other; first demodulating means for comparing phases of the first reference signal and an input modulated signal to demodulate the input modulated signal into a first binary baseband signal; second demodulating means for comparing phases of the second reference signal and the input modulated signal to demodulate the input modulated signal into a second binary baseband signal having a quadrature relation with the first baseband signal; first counting means for counting pulses of a clock signal in response to the first baseband signal, and outputting a signal representative of a result of said counting of the pulses of the clock signal in response to the first baseband signal; second counting means for counting pulses of the clock signal in response to the second baseband signal, and outputting a signal representative of a result of said counting of the pulses of the clock signal in response to the second baseband signal; means for generating an address signal in response to the output signals of the first and second counting means; and means for generating data representative of an absolute phase of the input modulated signal in response to the address signal.

A second aspect of this invention provides a complex angle converter comprising comparing means for deriving first difference data representing a difference between predetermined reference data and data represented by a first baseband signal, for deriving second difference data representing a difference between the predetermined reference data and data represented by a second baseband signal having a quadrature relation with the first baseband signal, for comparing absolute values of the first difference data and the second difference data, and for outputting a signal representative of a result of said comparing; means for grouping an inversion of a highest bit of the first baseband signal and second highest and lower bits of the second baseband signal into a first set; means for grouping a highest bit of the second baseband signal and second highest and lower bits of the first baseband signal into a second set; a selector for selecting one of the first set and the second set in response to the output signal of the comparing means; and a decoder for decoding the highest bit of the first baseband signal, the highest bit of the second baseband signal, and said selected one of the first set and the second set into data representing a complex angle.

A third aspect of this invention provides a timing signal generator comprising means for demodulating an input modulated signal into first and second baseband signals having a quadrature relation with each other; means for converting the first and second baseband signals into angle data representing a phase; means for calculating a difference between the phase represented by the current angle data and the phase represented by the previous angle data which precedes the current angle data by a 1-symbol interval, and outputting data representative of the calculated phase difference; means for converting the output data of the calculating means into a binary reference signal in response to which of predetermined divided regions contains a point corresponding to the calculated difference data; and means for generating a symbol timing signal in synchronism with the binary reference signal.

DESCRIPTION OF THE FIRST PREFERRED EMBODIMENT

Figure 1:
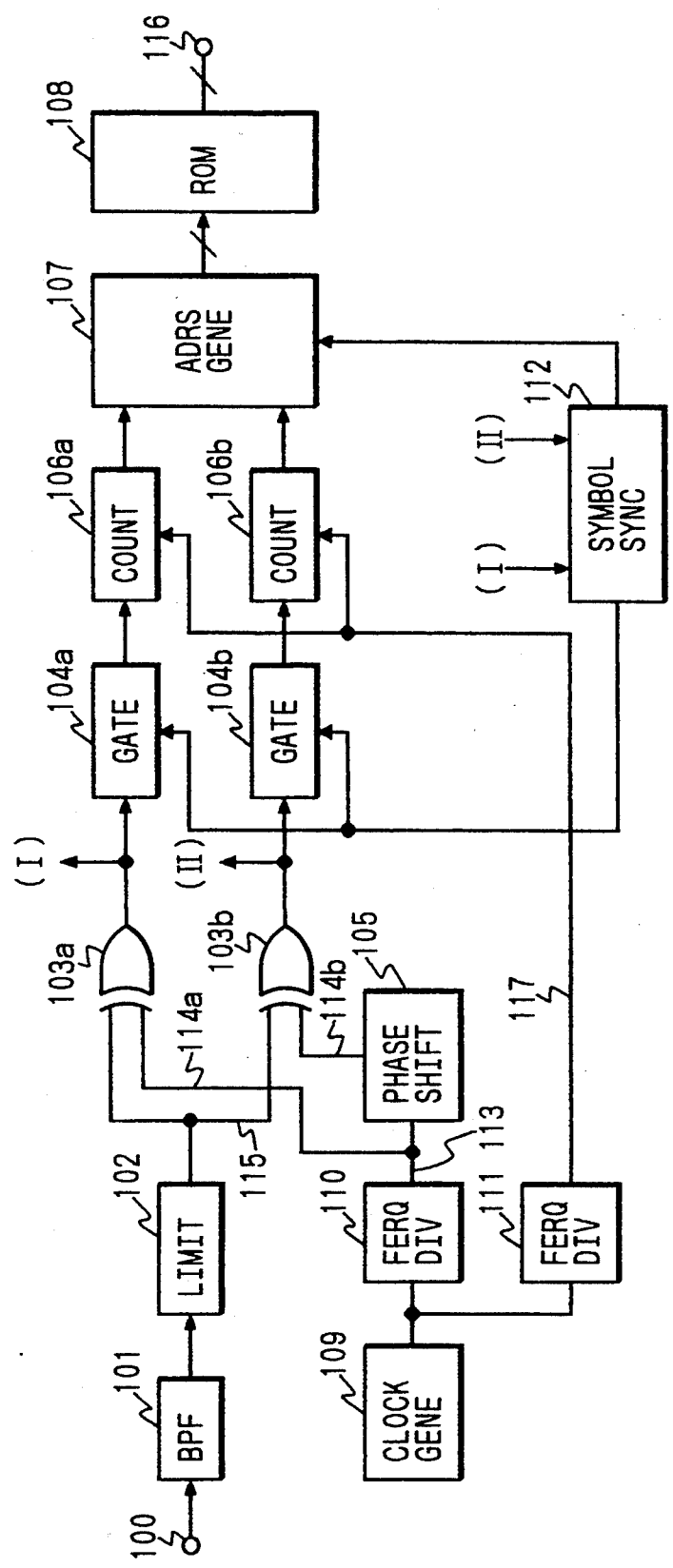
FIG. 1 is a block diagram of a digital modulation signal receiver according to a first embodiment of this invention.

With reference to FIG. 1, a receiver for a digital phase modulation signal includes a band pass filter (BPF) 101, a limiter 102, phase comparators 103a and 103b, gates 104a and 104b, a phase shifter 105, counters 106a and 106b, an address generator 107, a ROM 108, a clock signal generator 109, frequency dividers 110 and 111, and a symbol sync circuit 112.

A received signal which carries transmitted data is subjected to suitable frequency conversion, and the signal of the resultant of the frequency conversion is applied to an input terminal 100 of a demodulating section of the receiver as an input signal. The input signal passes through the BPF 101 which follows the input terminal 100. Then, the input signal reaches the limiter 102. The limiter 102 executes a process of limiting the amplitude of the input signal, and thereby converts the input signal into a constant-amplitude or constant-envelope signal 115.

The clock signal generator 109 outputs a basic clock signal to the frequency divider 110. The basic clock signal is divided in frequency by the frequency divider 110, being converted into a first detection reference signal 114a. The phase shifter 105 receives the first detection reference signal 114a from the frequency divider 110, and shifts the phase of the first detection reference signal 114a by 90 degrees so that the first detection reference signal is converted into a second detection reference signal 114b. The first and second detection reference signals 114a and 114b are in a quadrature relation.

The phase comparators 103a and 103b include Exclusive-OR circuits respectively. First input terminals of the Exclusive-OR circuits 103a and 103b receive the output signal 115 of the limiter 102. Second input terminals of the Exclusive-OR circuits 103a and 103b receive the first detection reference signal 114a and the second detection reference signal 114b from the frequency divider 110 and the phase shifter 105 respectively.

The Exclusive-OR circuit 103a executes logic Exclusive-OR operation between the output signal 115 of the limiter 102 and the first detection reference signal 114a to subject the output signal 115 of the limiter 102 to a detection process. The Exclusive-OR circuit 103b executes logic Exclusive-OR operation between the output signal 115 of the limiter 102 and the second detection reference signal 114b to subject the output signal 115 of the limiter 102 to a detection process. Output signals of the Exclusive-OR circuits 103a and 103b are data-representing baseband signals which are in a quadrature relation.

The gate 104a is connected between the Exclusive-OR circuit 103a and the counter 106a. The gate 104a receives the output signal of the Exclusive-OR circuit 103a, and switches on and off the output signal of the Exclusive-OR circuit 103a in response to a gate signal fed from the symbol sync circuit 112. Specifically, during a period for which the logic state of the gate signal is "1", the gate 104a is open so that the output signal of the Exclusive-OR circuit 103a is transmitted to the counter 106a. During a period for which the logic state of the gate signal is "0", the gate 104a is closed so that the transmission of the output signal of the Exclusive-OR circuit 103a to the counter 106a is inhibited. In this case, the gate 104a continuously outputs a "0" signal to the counter 106a.

The gate 104b is connected between the Exclusive-OR circuit 103b and the counter 106b. The gate 104b receives the output signal of the Exclusive-OR circuit 103b, and switches on and off the output signal of the Exclusive-OR circuit 103b in response to the gate signal fed from the symbol sync circuit 112. Specifically, during a period for which the logic state of the gate signal is "1", the gate 104b is open so that the output signal of the Exclusive-OR circuit 103b is transmitted to the counter 106b. During a period for which the logic state of the gate signal is "0", the gate 104b is closed so that the transmission of the output signal of the Exclusive-OR circuit 103b to the counter 106b is inhibited. In this case, the gate 104b continuously outputs a "0" signal to the counter 106b.

The clock signal generator 109 feeds the basic clock signal to the frequency divider 111. The basic clock signal is divided in frequency by the frequency divider 111, being converted into a counter clock signal 117. The frequency of the counter clock signal 117 is sufficiently higher than the frequency of the first and second detection reference signals 114a and 114b.

The counter 106a has a count enabling terminal subjected to the output signal of the gate 104a. The counter 106a also has a clock terminal subjected to the counter clock signal 117 fed from the frequency divider 111. During a period for which the logic state of the output signal of the gate 104a is "1", the counter 106a counts up pulses in the counter clock signal 117. During a period for which the logic state of the output signal of the gate 104a is "0", the counter 106 suspends the pulse counting-up process. Thus, the counter 106a can measure the length of a period, for which the logic state of the output signal of the gate 104a is "1", in unit of the period of the counter clock signal 117. Specifically, the counter 106a serves to measure the sum of the lengths of periods, for which the logic state of the output signal of the gate 104a is "1", during an interval determined by the gate signal. The counter 106a outputs a multi-bit parallel-form digital signal which represents the total number of the counted pulses, that is, the sum of the lengths of the previously-mentioned periods, during the interval determined by the gate signal. To enable the output signal of the counter 106a to be meaningful, the counter 106a is periodically reset in response to the gate signal outputted from the symbol sync circuit 112.

The counter 106b has a count enabling terminal subjected to the output signal of the gate 104b. The counter 106b also has a clock terminal subjected to the counter clock signal 117 fed from the frequency divider 111. During a period for which the logic state of the output signal of the gate 104b is "1", the counter 106b counts up pulses in the counter clock signal 117. During a period for which the logic state of the output signal of the gate 104b is "0", the counter 106b suspends the pulse counting-up process. Thus, the counter 106b can measure the length of a period, for which the logic state of the output signal of the gate 104b is "1", in unit of the period of the counter clock signal 117. Specifically, the counter 106b serves to measure the sum of the lengths of periods, for which the logic state of the output signal of the gate 104b is "1", during an interval determined by the gate signal. The counter 106b outputs a multi-bit parallel-form digital signal which represents the total number of the counted pulses, that is, the sum of the lengths of the previously-mentioned periods, during the interval determined by the gate signal. To enable the output signal of the counter 106b to be meaningful, the counter 106b is periodically reset in response to the gate signal outputted from the symbol sync circuit 112.

The address generator 107 receives the output digital signals of the counters 106a and 106b, and generates an address signal in response to the received digital signals. The address generator 107 may simply combine the output digital signals of the counters 106a and 106b into an address signal. The address generator 107 is periodically activated at every data detection timing (every symbol timing) in response to the gate signal fed from the symbol sync circuit 112.

The ROM 108 stores preset data representing an absolute phase reference table which determines a relation between an address signal and data of an absolute phase (demodulated data). Specifically, data representing different absolute phases are stored in different addresses in the ROM 108.

The address generator 107 outputs the address signal to the ROM 108. When the ROM 108 receives the address signal, the ROM 108 outputs the data of the absolute phase (the demodulated data) which corresponds to the received address signal. The absolute-phase data is transmitted from the ROM 108 to a later stage via an output terminal 116 of the demodulating section of the receiver.

Figure 3:
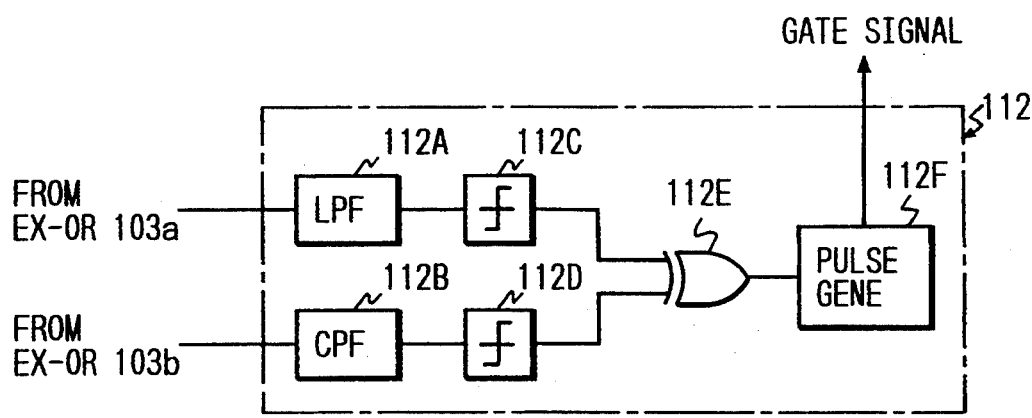
FIG. 3 is a block diagram of the symbol sync circuit in FIG. 1.

The symbol sync circuit 112 receives the output signals of the Exclusive-OR circuits 103a and 103b, and generates the gate signal in response thereto. As shown in FIG. 3, the symbol sync circuit 112 includes low pass filters (LPF's) 112A and 112B, wave-shaping circuits 112C and 112D, an Exclusive-OR circuit 112E, and a triggerable pulse generator 112F. The LPF 112A follows the Exclusive-OR circuit 103a (see FIG. 1), rejecting high-frequency components and extracting baseband components from the output signal of the Exclusive-OR circuit 103a. The output signal of the LPF 112A is converted by the wave-shaping circuit 112C into a corresponding binary signal which is applied to a first input terminal of the Exclusive-OR circuit 112E. The LPF 112B follows the Exclusive-OR circuit 103b (see FIG. 1), rejecting high-frequency components and extracting baseband components from the output signal of the Exclusive-OR circuit 103b. The output signal of the LPF 112B is converted by the wave-shaping circuit 112D into a corresponding binary signal which is applied to a second input terminal of the Exclusive-OR circuit 112E. The circuit 112E executes logic Exclusive-OR operation between the output signals of the wave-shaping circuits 112C and 112D, thereby generating a timing control signal in response to the output signals of the wave-shaping circuits 112C and 112D. The pulse generator 112F is triggered by the timing control signal outputted from the Exclusive-OR circuit 112E so that the pulse generator 112F produces the gate signal in response to the timing control signal. The pulse generator 112F includes, for example, a PLL circuit. The pulse generator 112F outputs the gate signal to the gates 104a and 104b and the address generator 107 (see FIG. 1). The gate signal has a period corresponding to the symbol timing.

Figure 2:
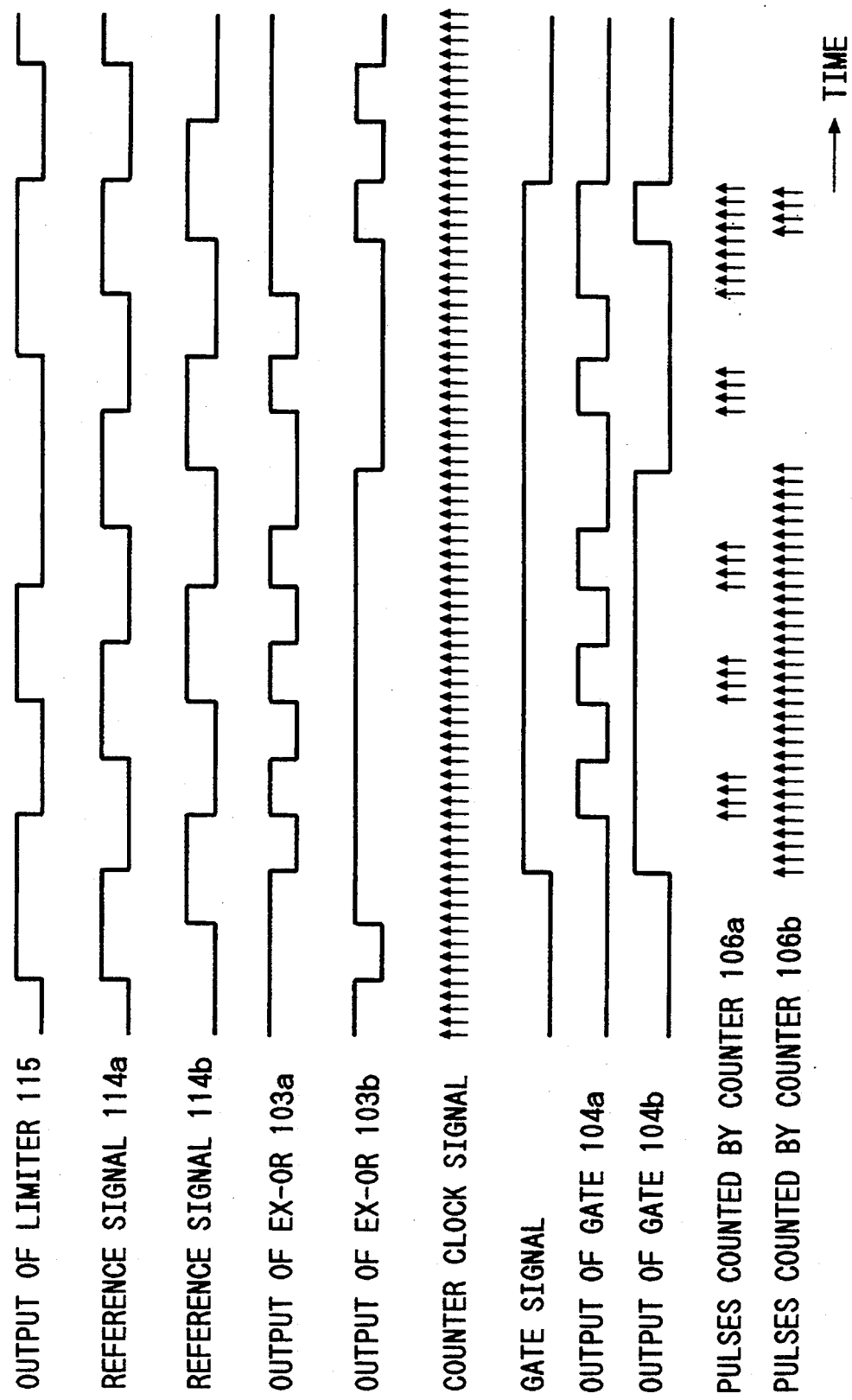
FIG. 2 is a time-domain diagram of the waveforms of various signals in the receiver of FIG. 1.

It is now assumed that the output signal 115 of the limiter 102 has a waveform of FIG. 2. The first and second detection reference signals 114a and 114b are rectangular pulse signals out of phase by 90 degrees as shown in FIG. 2. The Exclusive-OR circuit 103a executes logic Exclusive-OR operation between the output signal 115 of the limiter 102 and the first detection reference signal 114a, outputting a signal having a waveform shown in FIG. 2. The Exclusive-OR circuit 103b executes logic Exclusive-OR operation between the output signal 115 of the limiter 102 and the second detection reference signal 114b, outputting a signal having a waveform shown in FIG. 2. The gate signal fed to the gates 104a and 104b has a waveform of FIG. 2. The gate 104a switches on and off the output signal of the Exclusive-OR circuit 103a in response to the gate signal, outputting a signal having a waveform shown in FIG. 2. The gate 104b switches on and off the output signal of the Exclusive-OR circuit 103b in response to the gate signal, outputting a signal having a waveform shown in FIG. 2. The counter clock signal 117 fed to the counters 106a and 106b has a train of pulses with a frequency sufficiently higher than the frequency of the first and second detection reference signals 114a and 114b as shown in FIG. 2. The counters 106a and 106b are controlled in response to the output signals of the gates 104a and 104b. Specifically, only during periods for which the logic state of the output signal of the gate 104a is "1", the counter 106a counts up pulses in the counter clock signal 117. Thus, as shown in FIG. 2, the counter 106a counts up given pulses selected from among pulses in the counter clock signal 117. The number of the counted pulses represents the sum of the lengths of periods, for which the logic state of the output signal of the gate 104a is "1", during an interval determined by the gate signal. The counter 106a outputs the multi-bit parallel-form digital signal which represents the total number of the counted pulses, that is, the sum of the lengths of the previously-mentioned periods, during the interval determined by the gate signal. Only during periods for which the logic state of the output signal of the gate 104b is "1", the counter 106b counts up pulses in the counter clock signal 117. Thus, as shown in FIG. 2, the counter 106b counts up given pulses selected from among pulses in the counter clock signal 117. The number of the counted pulses represents the sum of the lengths of periods, for which the logic state of the output signal of the gate 104b is "1", during an interval determined by the gate signal. The counter 106b outputs the multi-bit parallel-form digital signal which represents the total number of the counted pulses, that is, the sum of the lengths of the previously-mentioned periods, during the interval determined by the gate signal.

A modulation signal speed (frequency) fs, the frequency fi of the input signal, and the frequency fc of the counter clock signal are in the relation as "fs<fi<fc". Generally, as the counter clock signal frequency fc is higher, the rate of consumption of electric power increases. According to the result of experimental simulation, it is sufficient that $2^3 fi \leq fc \leq 2^4 fi$. Provided that the input signal frequency fi is suitably chosen, the counter clock signal frequency fc can be set as "$2^6 fs \leq fc \leq 2^7 fs$".

DESCRIPTION OF THE SECOND PREFERRED EMBODIMENT

Figure 4:
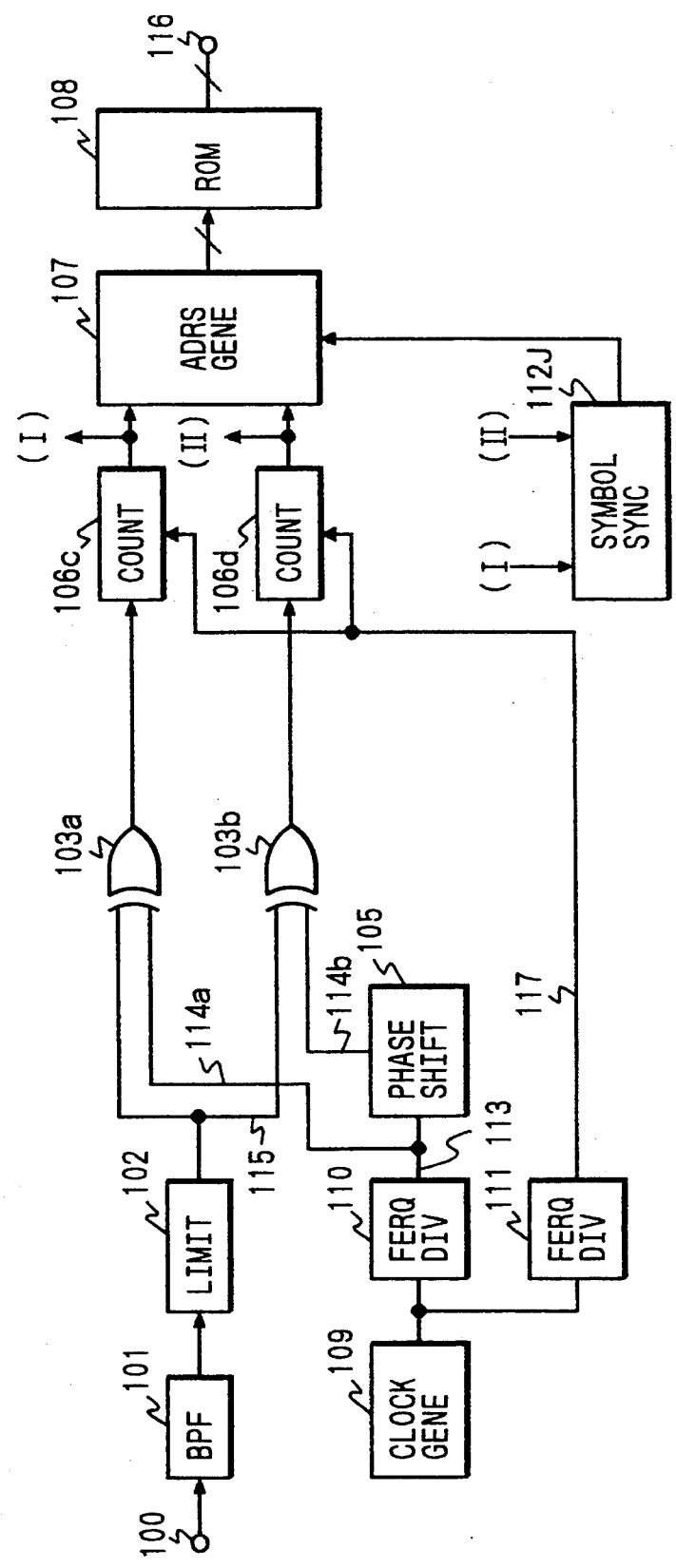
FIG. 4 is a block diagram of a digital modulation signal receiver according to a second embodiment of this invention.

FIG. 4 shows a second embodiment of this invention which is similar to the embodiment of FIGS. 1-3 except for design changes indicated hereinafter. The embodiment of FIG. 4 includes counters 106c and 106d instead of the counters 106a and 106b of FIG. 1. The counters 106c and 106d are directly coupled to Exclusive-OR gates 103a and 103b respectively. The embodiment of FIG. 4 includes a symbol sync circuit 112J instead of the symbol sync circuit 112 of FIG. 1. The symbol sync circuit 112J is connected to the output terminals of the counters 106c and 106d. In addition, the symbol sync circuit 112J is connected to an address generator 107.

As will be described later, the counters 106c and 106d are of the up-down counting type. It is unnecessary to periodically reset the counters 106c and 106d.

The symbol sync circuit 112J generates a symbol timing signal in response to the output signals of the counters 106c and 106d. The symbol sync circuit 112J outputs the symbol timing signal to the address generator 107. The address generator 107 is periodically activated at every data detection timing (every symbol timing) in response to the output signal of the symbol sync circuit 112J.

Figure 5:
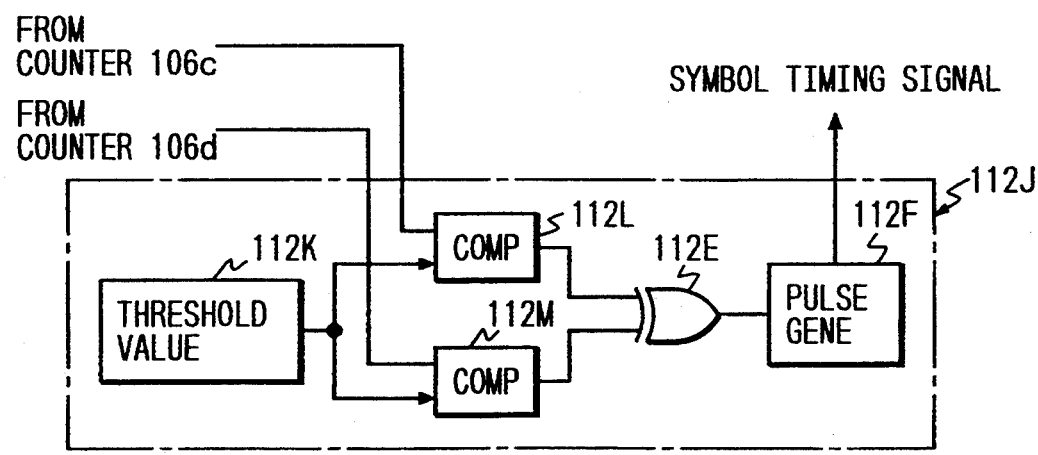
FIG. 5 is a block diagram of the symbol sync circuit in FIG. 4.

As shown in FIG. 5, the symbol sync circuit 112J includes a threshold value generator 112K, comparators 112L and 112M, an Exclusive-OR circuit 112E, and a triggerable pulse generator 112F. The counters 106c and 106d of FIG. 4 additionally have a low pass filtering function. Thus, the output signals of the counters 106c and 106d correspond to the output signals of the LPF's 112A and 112B of FIG. 3. A first input terminal of the comparator 112L receives the output signal of the counter 106c. A first input terminal of the comparator 112M receives the output signal of the counter 106d. The threshold value generator 112K outputs a signal representing a predetermined threshold value. The threshold value generator 112K includes, for example, a ROM. The output signal of the threshold value generator 112K is applied to second input terminals of the comparators 112L and 112M. The device 112L compares the threshold value and the value represented by the output signal of the counter 106c, and outputs a binary signal depending on the result of the comparison. The device 112M compares the threshold value and the value represented by the output signal of the counter 106d, and outputs a binary signal depending on the result of the comparison. The output signals of the comparators 112L and 112M are applied to input terminals of the Exclusive-OR circuit 112E. The circuit 112E executes logic Exclusive-OR operation between the output signals of the counters 112L and 112M, thereby generating a timing control signal in response to the output signals of the counters 112L and 112M. The pulse generator 112F is triggered by the timing control signal outputted from the Exclusive-OR circuit 112E so that the pulse generator 112F produces the symbol timing signal in response to the timing control signal. The pulse generator 112F includes, for example, a PLL circuit. The pulse generator 112F outputs the symbol timing signal to the address generator 107 (see FIG. 4).

Figure 6:
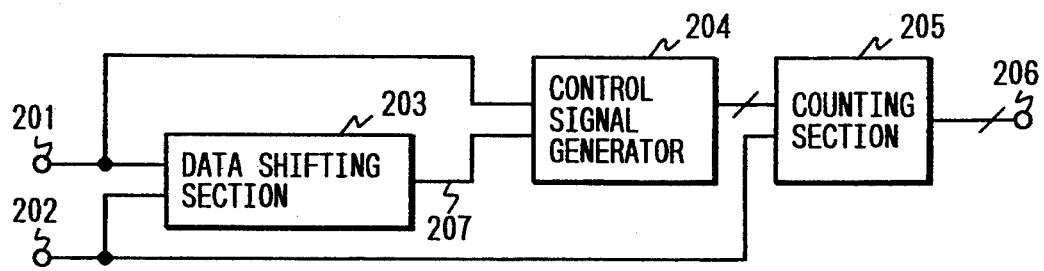
FIG. 6 is a block diagram of a first example of a counter.

FIG. 6 shows a first example of a counter which can be used as the counter 106c or 106d of FIG. 4. As shown in FIG. 6, the counter includes a data shifting section 203, a control signal generator 204, and a counting section 205. The data shifting section 203 receives a binary digital signal via a data input terminal 201. The binary digital signal represents input data. The binary digital signal is the output signal of the Exclusive-OR circuit 103a or 103b of FIG. 4. The data shifting section 203 has a predetermined number of stages connected in cascade or series. The data shifting section 203 receives the counter clock signal 117 (see FIG. 4) via a clock input terminal 202. The input data is stored into the combination of the stages, and is then periodically and sequentially shifted therein at timings determined by the counter clock signal. The control signal generator 204 produces control signals in response to the input data to the data shifting section 203 and output data from the data shifting section 203. The counting section 205 receives the counter clock signal 117 (see FIG. 4) via the clock input terminal 202. The counting section 205 receives the control signals from the control signal generator 204. The counting section 205 serves to count pulses in the counter clock signal. The counting of the pulses by the counting section 205 is controlled in response to the control signals.

Figure 7:
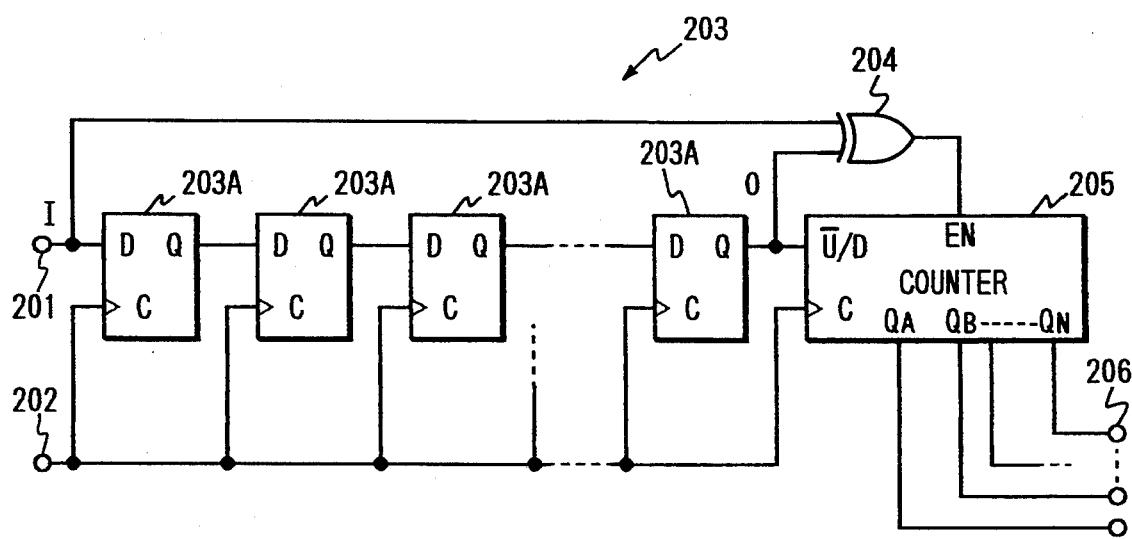
FIG. 7 is a detailed block diagram of the first example of the counter.

As shown in FIG. 7, the data shifting section 203 includes a cascade or series combination of a predetermined number of D-type flip-flops 203A. The data input terminal of the first flip-flop 203A receives the input data "I" via the counter input terminal 201. Regarding the first flip-flop to the flip-flop immediately preceding the last one, the data output terminal of a tip-flop is connected to the data input terminal of the subsequent flip-flop. The clock input terminal of each flip-flop receives the counter clock signal via the counter clock input terminal 202.

The control signal generator 204 includes an Exclusive-OR circuit. A first input terminal of the Exclusive-OR circuit 204 receives the input data "I" from the counter input terminal 201. A second input terminal of the Exclusive-OR circuit 204 receives output data "O" from the last flip-flop 203A in the data shifting section 203. The Exclusive-OR circuit 204 executes logic Exclusive-OR operation between the input data "I" and the output data "O" from the data shifting section 203, thereby generating a control signal in response to the input data "I" and the output data "O" from the data shifting section 203.

The counting section 205 includes an up-down counter having a count enabling control terminal EN, an up-down control terminal $\overline{U/D}$, a clock input terminal "C", and data output terminals QA, QB, ..., QN. The count enabling control terminal EN is subjected to the control signal generated by the Exclusive-OR circuit 204. The output data "O" from the last flip-flop 203A in the data shifting section 203 is fed to the up-down control terminal $\overline{U/D}$ as a control signal. Thus, it can be thought that the last flip-flop 203A in the data shifting section 203 is a part of the control signal generator 204 of FIG. 6. The clock input terminal "C" is subjected to the counter clock signal.

The input data "I" is periodically sampled and held by the data shifting section 203 at timings determined by the counter clock signal. The sampled and held data is periodically and sequentially shifted in the data shifting section 203 at timings of the counter clock signal before being outputted therefrom. When both the logic states of the current input data "I" and the current output data "O" from the data shifting section 203 are "0", the Exclusive-OR gate 204 outputs a "0" control signal to the count enabling control terminal EN of the up-down counter 205 so that operation of the counter 205 is suspended. When both the logic states of the current input data "I" and the current output data "O" from the data shifting section 203 are "1", the Exclusive-OR gate 204 outputs a "0" control signal to the count enabling control terminal EN of the up-down counter 205 so that operation of the counter 205 is suspended. When the logic states of the current input data "I" and the current output data "O" from the data shifting section 203 are different from each other, the Exclusive-OR gate 204 outputs a "1" control signal to the count enabling control terminal EN of the up-down counter 205 so that the counter 205 is enabled. In cases where the up-down counter 205 is enabled by the control signal from the Exclusive-OR circuit 204, when the logic states of the current input data "I" and the current output data "O" from the data shifting section 203 are "1" and "0" respectively, the "0" signal is applied to the up-down control terminal $\overline{U}/D$ of the counter 205 so that the counter 205 performs a counting-up process in synchronism with the counter clock signal. In addition, when the logic states of the current input data "I" and the current output data "O" from the data shifting section 203 are "0" and "1" respectively, the "1" signal is applied to the up-down control terminal $\overline{U}/D$ of the counter 205 so that the counter 205 performs a counting-down process in synchronism with the counter clock signal.

The up-down counter 205 outputs data via the data output terminals QA, QB, ..., QN. The output data from the up-down counter 205 is transmitted to the address generator 107 of FIG. 4 via the output terminal 206. The number represented by the output data from the up-down counter 205 is equal to the result of the addition of the data held by the flip-flops 203A in the data shifting section 203. In other words, the number represented by the output data from the up-down counter 205 is equal to the total number of "1" signals held by the flip-flops 203A in the data shifting section 203. These equalities are understood from the following facts. When the logic states of the current input data "I" and the current output data "O" from the data shifting section 203 are equal to each other, the result of the addition of the data held by the flip-flops 203A in the data shifting section 203 remains unchanged. In this case, as previously described, the operation of the up-down counter 205 is suspended by the control signal fed from the Exclusive-OR circuit 204 so that the number represented by the output data from the counter 205 remains unchanged. When the logic states of the current input data "I" and the current output data "O" from the data shifting section 203 are "1" and "0" respectively, the result of the addition of the data held by the flip-flops 203A in the data shifting section 203 increases by one. In this case, as previously described, the up-down counter 205 performs the counting-up process in response to the data "O" so that the number represented by the output data from the counter 205 increases by one. When the logic states of the current input data "I" and the current output data "O" from the data shifting section 203 are "0" and "1" respectively, the result of the addition of the data held by the flip-flops 203A in the data shifting section 203 decreases by one. In this case, as previously described, the up-down counter 205 performs the counting-down process in response to the data "O" so that the number represented by the output data from the counter 205 decreases by one.

It should be noted that the flip-flops 203A in the data shifting section 203 are cleared under initial conditions.

Figure 8:
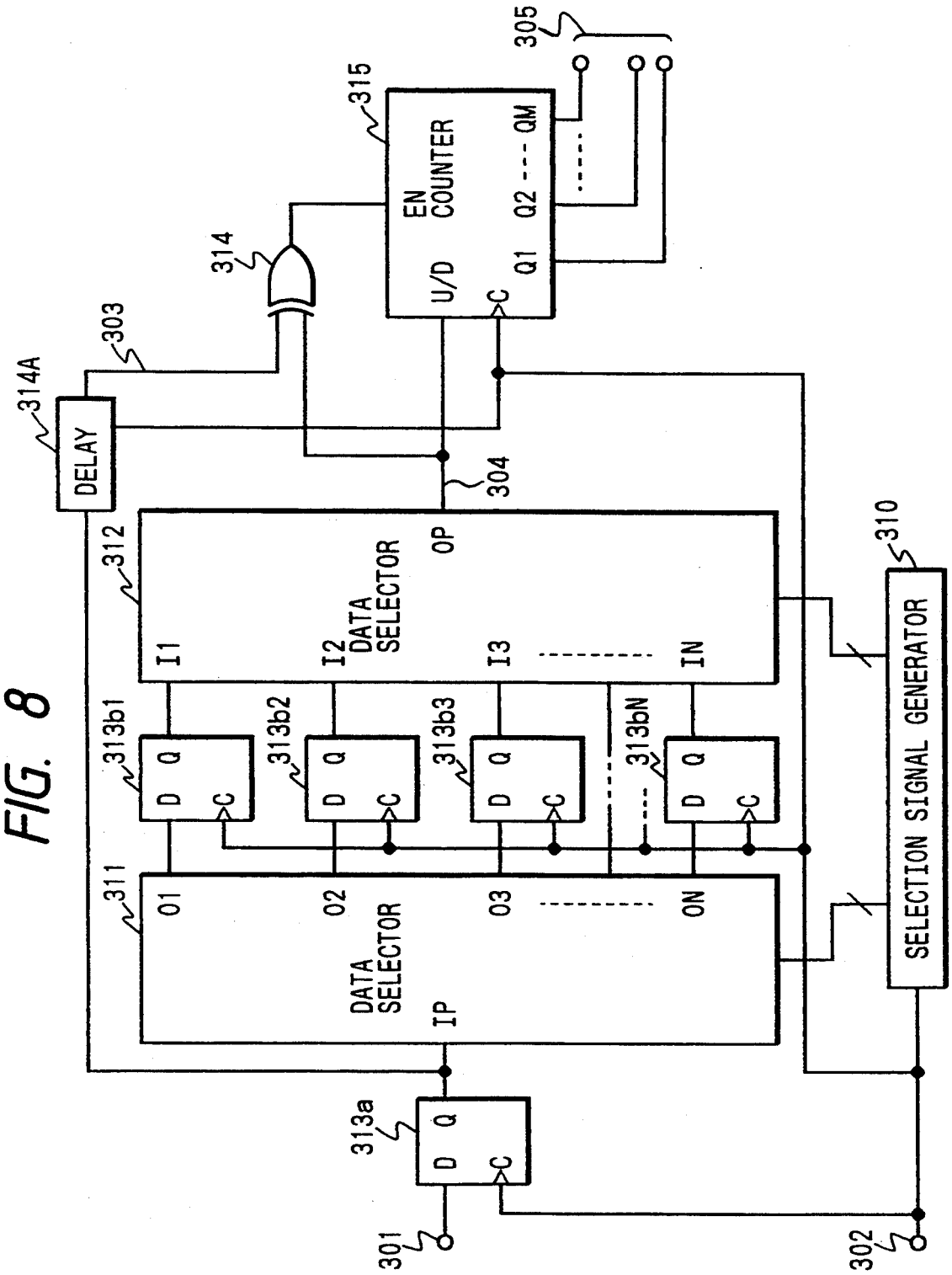
FIG. 8 is a block diagram of a second example of a counter.

FIG. 8 shows a second example of a counter which can be used as the counter 106c or 106d of FIG. 4. As shown in FIG. 8, the counter includes a selection signal generator 310, data selectors 311 and 312, D-type latches (flip-flops) 313a, 313b1, 313b2, ..., 313bN, an Exclusive-OR circuit 314, an up-down counting section 315 (referred to as the up-down counter hereinafter), and a delay circuit 314A.

The data input terminal of the latch 313a receives a binary digital signal via a counter input terminal 301. The binary digital signal represents input data. The binary digital signal is the output signal of the Exclusive-OR circuit 103a or 103b of FIG. 4. The clock input terminal of the latch 313a receives the counter clock signal 117 (see FIG. 4) via a counter clock input terminal 302. The input data is periodically sampled and held by the latch 313a at timings determined by the counter clock signal.

The data selector 311 has an input terminal IP which is connected to the data output terminal of the latch 313a. The data selector 311 has a predetermined number of output terminals O1, O2, ..., ON. The data selector 311 receives a selection signal from the selection signal generator 310. In the data selector 311, the output data of the latch 313a is sequentially and cyclically distributed from the input terminal IP to one of the output terminals O1, O2, ..., ON in response to the selection signal.

The data input terminals of the latches 313b1, 313b2, ..., 313bN are connected to the output terminals O1, O2, ..., ON of the data selector 311 respectively. The clock input terminals of the latches 313b1, 313b2, ..., 313bN receive the counter clock signal via the counter clock input terminal 302.

The data selector 312 has a predetermined number of input terminals I1, I2, ..., IN which are connected to the data output terminals of the latches 313b1, 313b2, ..., 313bN respectively. The data selector 312 has an output terminal OP. The data selector 312 receives a selection signal from the selection signal generator 310. In the data selector 312, the output terminal OP is sequentially and cyclically connected to one of the input terminals I1, I2, ..., IN in response to the selection signal.

The input terminal of the delay circuit 314A is connected to the data output terminal of the latch 313a. The delay circuit 314A has a control terminal subjected to the counter clock signal which is fed via the counter clock input terminal 302. The delay circuit 314A delays the output data from the latch 313a by a period of the counter clock signal.

A first input terminal of the Exclusive-OR circuit 314 is connected to the output terminal of the delay circuit 314A. A second input terminal of the Exclusive-OR circuit 314 is connected to the output terminal OP of the data selector 312. The Exclusive-OR circuit 314 executes logic Exclusive-OR operation between the output data 303 from the delay circuit 314A and the output data 304 from the data selector 312, thereby generating a control signal in response to the output data 303 from the delay circuit 314A and the output data 304 from the data selector 312.

The selection signal generator 310 receives the counter clock signal via the counter clock input terminal 302. The selection signal generator 310 subjects the counter clock signal to a frequency dividing process and phase shifting processes, thereby generating the selection signals in response to the counter clock signal. The selection signals are fed from the selection signal generator 310 to the data selectors 311 and 312.

The up-down counter 315 has a count enabling control terminal EN, an up-down control terminal $\overline{U}/D$, a clock input terminal "C", and data output terminals QA, QB, ..., QM. The count enabling control terminal EN is subjected to the control signal generated by the Exclusive-OR circuit 314. The output data 304 from the data selector 312 is fed to the up-down control terminal $\overline{U}/D$ as a control signal. The clock input terminal "C" is subjected to the counter clock signal.

Operation of the Exclusive-OR circuit 314 and the up-down counter 315 is similar to operation of the Exclusive-OR circuit 204 and the up-down counter 205 of FIG. 7. The combination of the devices 310, 311, 312, 313b1, 313b2, ..., 313bN operates similarly to operation of the data shifting section 203 of FIG. 7.

Operation of the combination of the devices 310, 311, 312, 313b1, 313b2, ..., 313bN will be described hereinafter. It is now assumed that the total number of the latches 313b1, 313b2, ..., 313bN is four. The counter clock signal 117 has a train of rectangular pulses with a predetermined frequency as shown in the portion (a) of FIG. 9. The latches 313a, 313b1, 313b2, 313b3, and 313b4 are activated in response to every rising edge in the counter clock signal. The selection signal generator 310 divides the frequency of the counter clock signal by four and executes a phase shifting process, thereby generating first, second, third, and fourth selection signals having waveforms shown in the portions (b)–(e) of FIG. 9. The phases of the first, second, third, and fourth selection signals are spaced at equal angles of 90 degrees.

Figure 10:
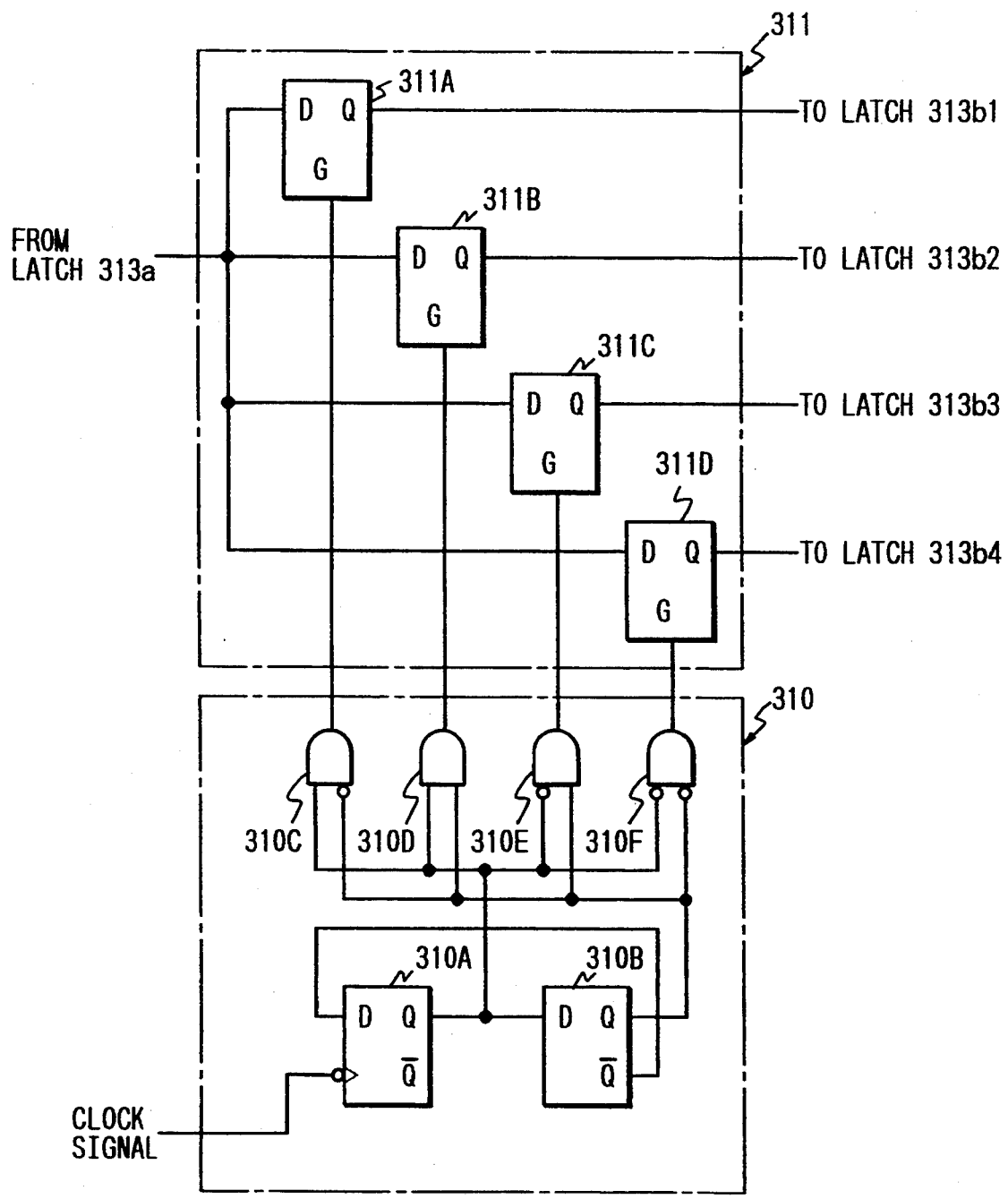
FIG. 10 is a block diagram of the input side data selector and the selection signal generator in FIG. 8.

The selection signal generator 310 includes, for example, a Johnson counter. Specifically, as shown in FIG. 10, the selection signal generator 310 includes D-type flip-flops 310A and 310B, and logic operation elements 310C, 310D, 310E, and 310F. The clock input terminal of the flip-flop 310A is subjected to the counter clock signal. The data input terminal of the flip-flop 310A is connected to the $\overline{Q}$ output terminal of the flip-flop 310B. The Q output terminal of the flip-flop 310A is connected to the data input terminal of the flip-flop 310B. The Q output terminal of the flip-flop 310A is connected to first input terminals of the logic operation elements 310C, 310D, 310E, and 310F. The Q output terminal of the flip-flip 310B is connected to second input terminals of the logic operation elements 310C, 310D, 310E, and 310F. The logic operation elements 310C, 310D, 310E, and 310F output the first, second, third, and fourth selection signals to the data selector 311.

The input data is periodically sampled and held by the latch 313a at timings determined by the counter clock signal. Thus, the output signal 303 from the latch 313a is periodically updated at timings equal to the moments of the occurrence of rising edges in the counter dock signal as shown in the portion (f) of FIG. 9.

As shown in FIG. 10, the data selector 311 includes D-type latches 311A, 311B, 311C, and 311D. The data input terminals of the latches 311A, 311B, 311C, and 311D are subjected to the output signal of the latch 313a. The output terminals of the latches 311A, 311B, 311C, and 311D are connected to the data input terminals of the latches 313b1, 313b2, 313b3, and 313b4 respectively. The control terminals of the latches 311A, 311B, 311C, and 311D are connected to the output terminals of the logic operation elements 310C, 310D, 310E, and 310F in the selection signal generator 310 respectively so that they receive the first, second, third, and fourth selection signals respectively.

The output signal of the latch 313a is periodically sampled and held by the latch 311A in the data selector 311 at first timings determined by the first selection signal. The output signal of the latch 313a is periodically sampled and held by the latch 311B in the data selector 311 at second timings determined by the second selection signal. The output signal of the latch 313a is periodically sampled and held by the latch 311C in the data selector 311 at third timings determined by the third selection signal. The output signal of the latch 313a is periodically sampled and held by the latch 311D in the data selector 311 at fourth timings determined by the fourth selection signal. The first, second, third, and fourth timings are spaced by equal angular intervals of 90 degrees so that the output signal of the latch 313a is sequentially and cyclically distributed via the latches 311A, 311B, 311C, and 311D to one of the latches 313b1, 313b2, 313b3, and 313b4.

Figure 9:
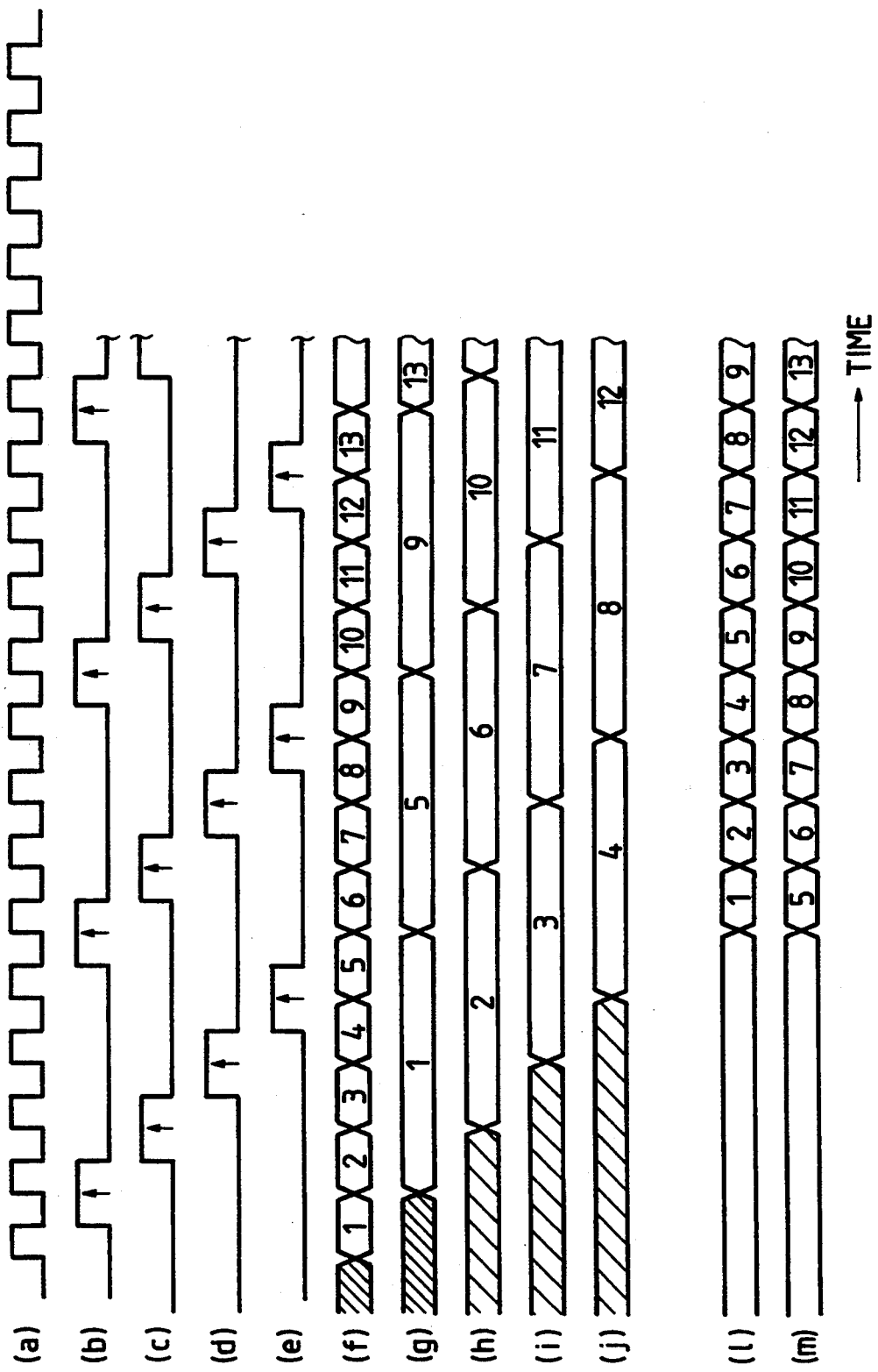
FIG. 9 is a time-domain diagram of the states of various signals in the counter of FIG. 8.

During a first period of the counter clock signal, the current output data from the latch 313a is transmitted via the latch 311A in the data selector 311 to the latch 313b1 in response to the first selection signal (see the portion (b) of FIG. 9). Thus, the output data from the latch 313a is sampled and held by the latch 313b1 immediately before the updating thereof. In addition, the data held in the latch 313b1 is transmitted via a data selecting portion of the data selector 312 to the output terminal OP thereof in response to the first selection signal. During a second period of the counter clock signal, the current output data from the latch 313a is transmitted via the latch 311B in the data selector 311 to the latch 313b2 in response to the second selection signal (see the portion (c) of FIG. 9). Thus, the output data from the latch 313a is sampled and held by the latch 313b2 immediately before the updating thereof. In addition, the data held in the latch 313b2 is transmitted via the data selecting portion of the data selector 312 to the output terminal OP thereof in response to the second selection signal. During a third period of the counter clock signal, the current output data from the latch 313a is transmitted via the latch 311C in the data selector 311 to the latch 313b3 in response to the third selection signal (see the portion (d) of FIG. 9). Thus, the output data from the latch 313a is sampled and held by the latch 313b3 immediately before the updating thereof. In addition, the data held in the latch 313b3 is transmitted via the data selecting portion of the data selector 312 to the output terminal OP thereof in response to the third selection signal. During a fourth period of the counter clock signal, the current output data from the latch 313a is transmitted via the latch 311D in the data selector 311 to the latch 313b4 in response to the fourth selection signal (see the portion (e) of FIG. 9). Thus, the output data from the latch 313a is sampled and held by the latch 313b4 immediately before the updating thereof. In addition, the data held in the latch 313b4 is transmitted via the data selecting portion of the data selector 312 to the output terminal OP thereof in response to the fourth selection signal. These processes are reiterated.

The state of the data held in the latch 313b1 varies as shown in the portion (g) of FIG. 9. The state of the data held in the latch 313b2 varies as shown in the portion (h) of FIG. 9. The state of the data held in the latch 313b3 varies as shown in the portion (i) of FIG. 9. The state of the data held in the latch 313b4 varies as shown in the portion (j) of FIG. 9. The state of the data which appears at the output terminal OP of the data selector 312, that is, the state of the output data 304 from the data selector 312, varies as shown in the portion (l) of FIG. 9. The state of the output data 303 from the delay circuit 314A varies as shown in the portion (m) of FIG. 9. The output data 304 from the data selector 312 is delayed from the output data 303 from the delay circuit 314A by an interval equal to four times the period of the counter clock signal.

Figure 11:
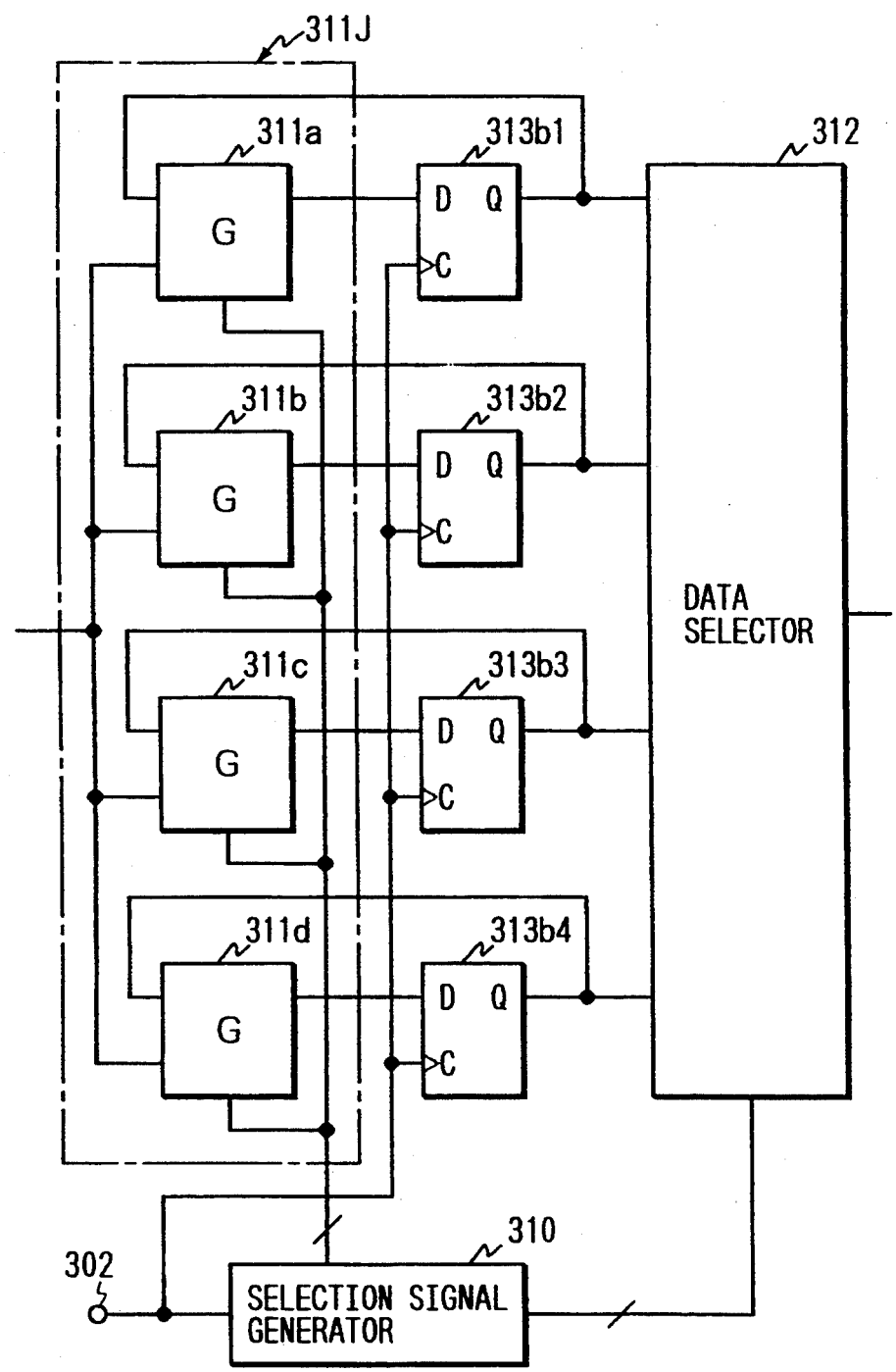
FIG. 11 is a block diagram of an input side data selector and related devices.

FIG. 11 shows a data selector 311J which can be used instead of the data selector 311 of FIG. 8. As shown in FIG. 11, the data selector 311J includes gates 311a, 311b, 311c, and 311d. The output terminals of the gates 311a, 311b, 311c, and 311d are connected to the data input terminals of the latches 313b1, 313b2, 313b3, and 313b4 respectively. The control terminals of the gates 311a, 311b, 311c, and 311d are connected to the selection signal generator 310 so that they receive the first, second, third, and fourth selection signals respectively. First input terminals of the gates 311a, 311b, 311c, and 311d are connected to the output terminal of the latch 313a (see FIG. 8). Second input terminals of the gates 311a, 311b, 311c, and 311d are connected to the output terminals of the latches 313b1, 313b2, 313b3, and 313b4 respectively.

Figure 12:
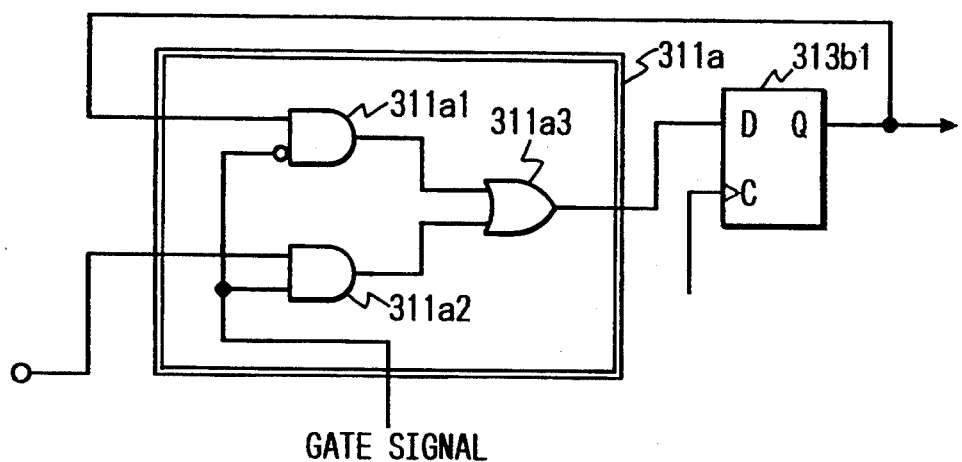
FIG. 12 is a block diagram of the gate in FIG. 11.

As shown in FIG. 12, the gate 311a includes logic operation elements 311a1, 311a2, and 311a3. A first input terminal of the logic operation element 311a2 is connected to the output terminal of the latch 313a (see FIG. 8). A first input terminal of the logic operation element 311a1 is connected to the output terminal of the latch 313b1. Second input terminals of the logic operation elements 311a1 and 311a2 are subjected to the first selection signal. The output terminals of the logic operation elements 311a1 and 311a2 are connected to input terminals of the logic operation element 311a3 respectively. The output terminal of the logic operation element 311a3 is connected to the data input terminal of the latch 313b1. The internal structure of the gates 311b, 311c, and 311d are similar to the internal structure of the gate 311a.

Figure 13:
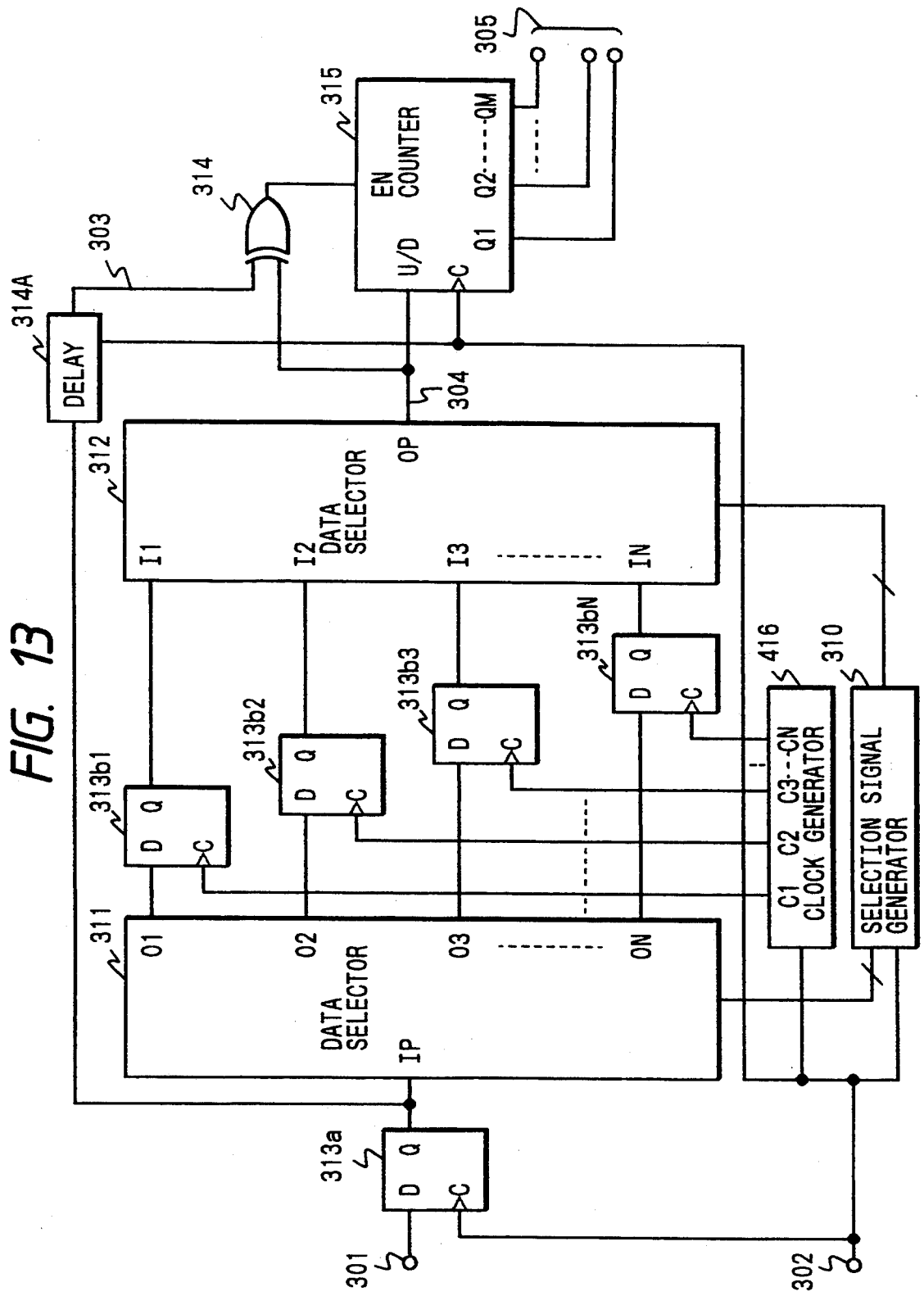
FIG. 13 is a block diagram of a third example of a counter.

FIG. 13 shows a third example of a counter which can be used as the counter 106c or 106d of FIG. 4. The counter of FIG. 13 is similar to the counter of FIG. 8 except for design changes indicated hereinafter. The counter of FIG. 13 includes a low-frequency clock generator 416. The low-frequency clock generator 416 receives a counter clock signal via a counter clock input terminal 302. It is now assumed that the total number of latches 313b1, 313b2, ..., 313bN is four. The low-frequency clock generator 416 divides the frequency of the counter clock signal by four and executes a phase shifting process, thereby generating first, second, third, and fourth low-frequency clock signals having phases spaced by equal angular intervals of 90 degrees. The low-frequency clock generator 416 outputs the first, second, third, and fourth low-frequency clock signals to the clock input terminals of the first, second, third, and fourth latches 313b1, 313b2, 313b3, and 313b4 respectively. The latches 313b1, 313b2, 313b3, and 313b4 execute data latching processes at timings determined by the first, second, third, and fourth low-frequency clock signals respectively.

Figure 14:
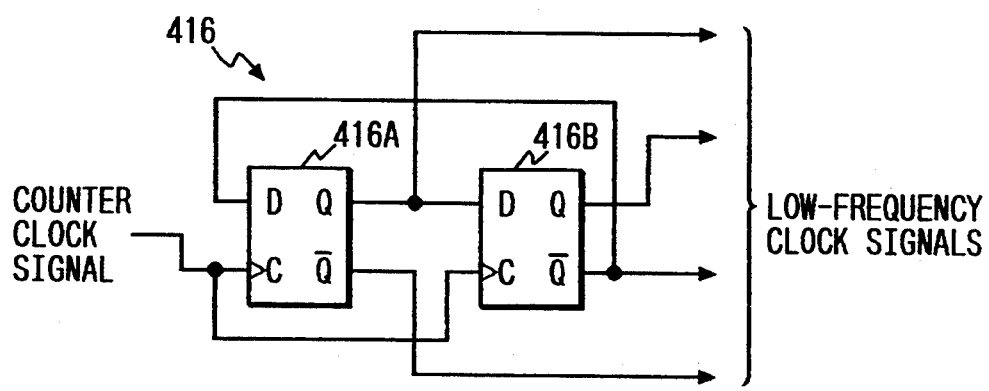
FIG. 14 is a block diagram of the low-frequency clock generator in FIG. 13.

As shown in FIG. 14, the low-frequency clock generator 416 includes D-type flip-flops 416A and 416B. The clock input terminals of the flip-flops 416A and 416B are subjected to the counter clock signal. The data input terminal of the flip-flop 416A is connected to the $\overline{Q}$ output terminal of the flip-flop 416B. The Q output terminal of the flip-flop 416A is connected to the data input terminal of the flip-flop 416B. The first, second, third, and fourth low-frequency clock signals appear at the Q output terminal of the flip-flop 416A, the Q output terminal of the flip-flop 416B, the $\overline{Q}$ output terminal of the flip-flop 416A, and the $\overline{Q}$ output terminal of the flip-flop 416B respectively.

DESCRIPTION OF THE THIRD PREFERRED EMBODIMENT

Figure 15:
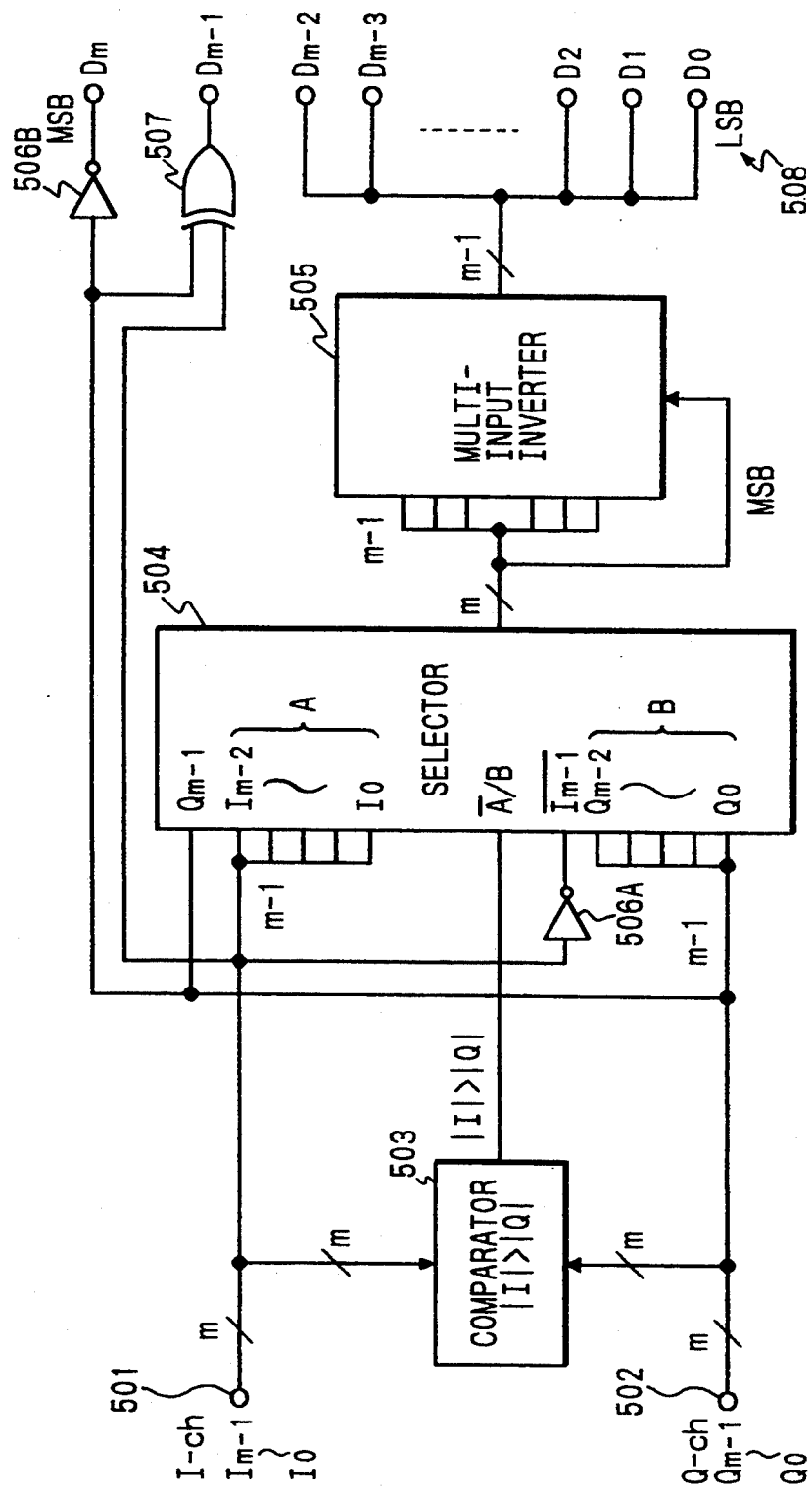
FIG. 15 is a block diagram of a complex angle converter according to a third embodiment of this invention.

A third embodiment of this invention is directed to a complex angle converter which can be used as the combination of the address generator 107 and the ROM 108 of FIG. 1 or FIG. 4. FIG. 15 shows the complex angle converter of this embodiment.

As shown in FIG. 15, the complex angle converter includes an absolute-value comparator 503, a selector 504, a multi-input-bit inverter 505, inverters 506A and 506B, and an Exclusive-OR circuit 507.

A complex basebad I-channel m-bit digital signal has bits $I_0, I_1, \ldots, I_{m-1}$, where "m" denotes a predetermined natural number. The I-channel signal is fed to the comparator 503 via an input terminal 501. A complex baseband Q-channel m-bit digital signal has bits $Q_0, Q_1, \ldots, Q_{m-1}$. The Q-channel signal is fed to the comparator 503 via an input terminal 502. The comparator 503 derives first difference data representing a difference between predetermined reference data and the data represented by the I-channel signal. The comparator 503 derives second difference data representing a difference between the predetermined reference data and the data represented by the Q-channel signal. The comparator 503 calculates the absolute values of the first and second difference data. The predetermined reference data corresponds to the origin in a complex plane of the I-channel signal and the Q-channel signal. Thus, the calculated absolute value of the first difference data corresponds to the distance between the origin and the point of the I-channel signal. In addition, the calculated absolute value of the second difference data corresponds to the distance between the origin and the point of the Q-channel signal. The device 503 compares the absolute values of the first and second difference data. The output signal of the comparator 503 which represents the result of the comparison is applied to the control terminal of the selector 504.

The selector 504 includes a first m-bit input terminal "A" and a second m-bit input terminal "B". The bits $I_0, I_1, \ldots, I_{m-2}$ of the I-channel signal are fed to the lowest bit to the second highest bit of the first input terminal "A" of the selector 504 respectively. The highest bit $Q_{m-1}$ of the Q-channel signal is fed to the highest bit of the first input terminal "A" of the selector 504. The bits $Q_0, Q_1, \ldots, Q_{m-2}$ of the Q-channel signal are fed to the lowest bit to the second highest bit of the second input terminal "B" of the selector 504 respectively. The highest bit $I_{m-1}$ of the I-channel signal is inverted by the inverter 506A. The output signal $\overline{I_{m-1}}$ of the inverter 506A is fed to the highest bit of the second input terminal "B" of the selector 504. The selector 504 selects one of the m-bit signals fed to the first and second input terminals "A" and "B" thereof in response to the output signal of the comparator 503. The selector 504 outputs the selected m-bit signal to the multi-input-bit inverter 505.

The lowest bit to the second highest bit of the m-bit output signal of the selector 504 are applied to the data input terminals of the multi-input-bit inverter 505. The multi-input-bit inverter 505 is of the controllable type, having a control terminal. The highest bit (MSB) of the m-bit output signal of the selector 504 is applied to the control terminal of the multi-input-bit inverter 505. The multi-input-bit inverter 505 selectively inverts and non-inverts the lowest bit to the second highest bit of the m-bit output signal of the selector 504 in response to the highest bit of the m-bit output signal of the selector 504. The lowest bit to the highest bit of the (m−1)-bit output signal of the multi-input-bit inverter 505 are applied to an output terminal 508 as the lowest bit $D_0$ to the third highest bit $D_{m-2}$ of (m+1)-bit output angle data respectively.

The Exclusive-OR circuit 507 executes logic Exclusive-OR operation between the highest bits $I_{m-1}$ and $Q_{m-1}$ of the I-channel signal and the Q-channel signal. The output signal of the Exclusive-OR circuit 507 is applied to the output terminal 508 as the second highest bit $D_{m-1}$ of the (m+1)-bit output angle data. The highest bit $Q_{m-1}$ of the Q-channel signal is inverted by the inverter 506B. The output signal of the inverter 506B is applied to the output terminal 508 as the highest bit $D_m$ of the (m+1)-bit output angle data.

The multi-input-bit inverter 505, the inverter 506B, and the Exclusive-OR circuit 507 compose a decoder. The (m+1)-bit output angle data represents the phase angle in a complex plane which is determined by the I-channel signal and the Q-channel signal.

Figure 16:
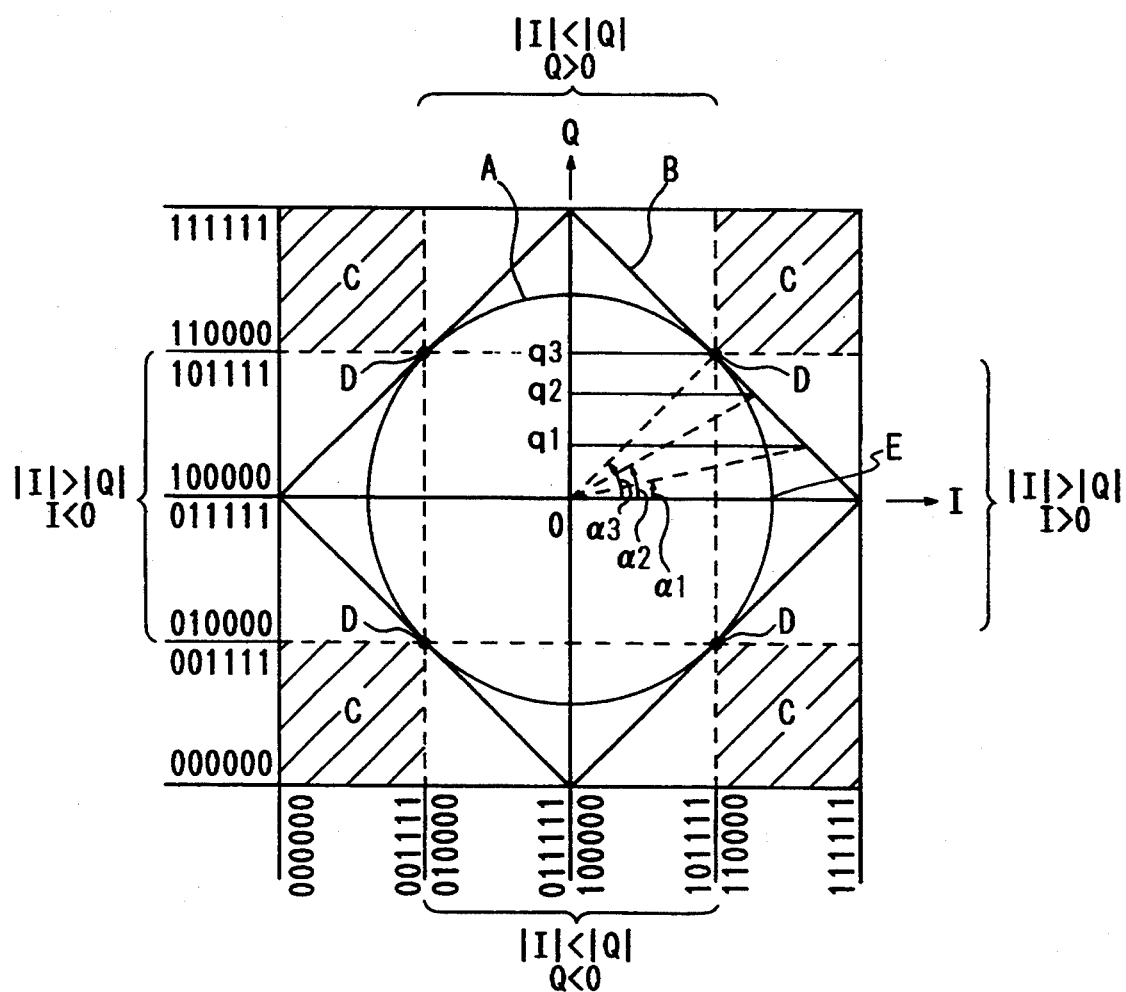
FIG. 16 is a diagram of the ideal waveforms of demodulated signals in a basebad complex plane.

Generally, the ideal waveform (envelope) of a signal which results from detection of a phase-modulated signal takes such a shape "A" or "B" in a baseband complex plane as shown in FIG. 16. The waveform (envelope) "A" occurs in the case of detection using analog mixers. The waveform (envelope) "B" occurs in the case of detection using Exclusive-OR logic mixers.

In the case of the waveform "A", the baseband complex plane can be divided into four regions according to the result of the comparison between the distances of I-channel and Q-channel signals from the origin and according to the highest bit (MSB) of the I-channel signal or the Q-channel signal which has the longer distance from the origin. The distances of the I-channel and Q-channel signals from the origin are now denoted by $|I|$ and $|Q|$ respectively. The first region corresponds to conditions where $|I|>|Q|$ and $I>0$. In FIG. 16, the thick line E on the circumference represents the first region. The second region corresponds to conditions where $|I|>|Q|$ and $I<0$. The third region corresponds to conditions where $|I|<|Q|$ and $Q>0$. The fourth region corresponds to conditions where $|I|<|Q|$ and $Q<0$.

In the first region where $|I|>|Q|$ and $I>0$, the direction of increasing the signal phase angle agrees with the direction of increasing the value of data of the Q-channel signal. In addition, there is approximately a one-to-one correspondence between the lower (m−1) bits of the Q-channel signal and the lower (m−1) bits of the phase angle signal.

In the second region where $|I|>|Q|$ and $I<0$, the direction of increasing the signal phase angle agrees with the direction of decreasing the value of data of the Q-channel signal. In addition, there is approximately a one-to-one correspondence between the lower (m−1) bits of the Q-channel signal and the lower (m−1) bits of the phase angle signal.

In the third region where $|I|<|Q|$ and $Q>0$, the direction of increasing the signal phase angle agrees with the direction of decreasing the value of data of the I-channel signal. In addition, there is approximately a one-to-one correspondence between the lower (m−1) bits of the I-channel signal and the lower (m−1) bits of the phase angle signal.

In the fourth region where $|I|<|Q|$ and $Q<0$, the direction of increasing the signal phase angle agrees with the direction of increasing the value of data of the I-channel signal. In addition, there is approximately a one-to-one correspondence between the lower (m−1) bits of the I-channel signal and the lower (m−1) bits of the phase angle signal.

As is understood from the previous description, the characteristics of data conversion of the lower (m−1) bits should be changed in accordance with which of the first, second, third, and fourth regions contains the resultant of the I-channel signal and the Q-channel signal. The output signal of the comparator 503 and the highest bit (MSB) of the output signal of the selector 504 indicate which of the first, second, third, and fourth regions contains the resultant of the I-channel signal and the Q-channel signal. The selector 504 and the the multi-input-bit inverter 505 cooperate to execute data conversion of the lower (m−1) bits in response to which of the first, second, third, and fourth regions contains the resultant of the I-channel signal and the Q-channel signal. As a result of the data conversion of the lower (m−1) bits, the lower bits $D_0, D_1, \ldots, D_{m-2}$ of the output angle data are provided. The output signal of the inverter 506B, that is, the inversion of the highest bit $Q_{m-1}$ of the Q-channel signal, is used as the highest bit $D_m$ of the output angle data. The output signal of the Exclusive-OR circuit 507, that is, the result of logic Exclusive-OR operation between the highest bits $I_{m-1}$ and $Q_{m-1}$ of the I-channel signal and the Q-channel signal, is used as the second highest bit $D_{m-1}$ of the output angle data.

Signal processing and signal conversion similar to the above-mentioned signal processing and signal conversion in the case of the waveform "A" of FIG. 16 can be applied to the case of the waveform "B" of FIG. 16.

DESCRIPTION OF THE FOURTH PREFERRED EMBODIMENT

Figure 17:
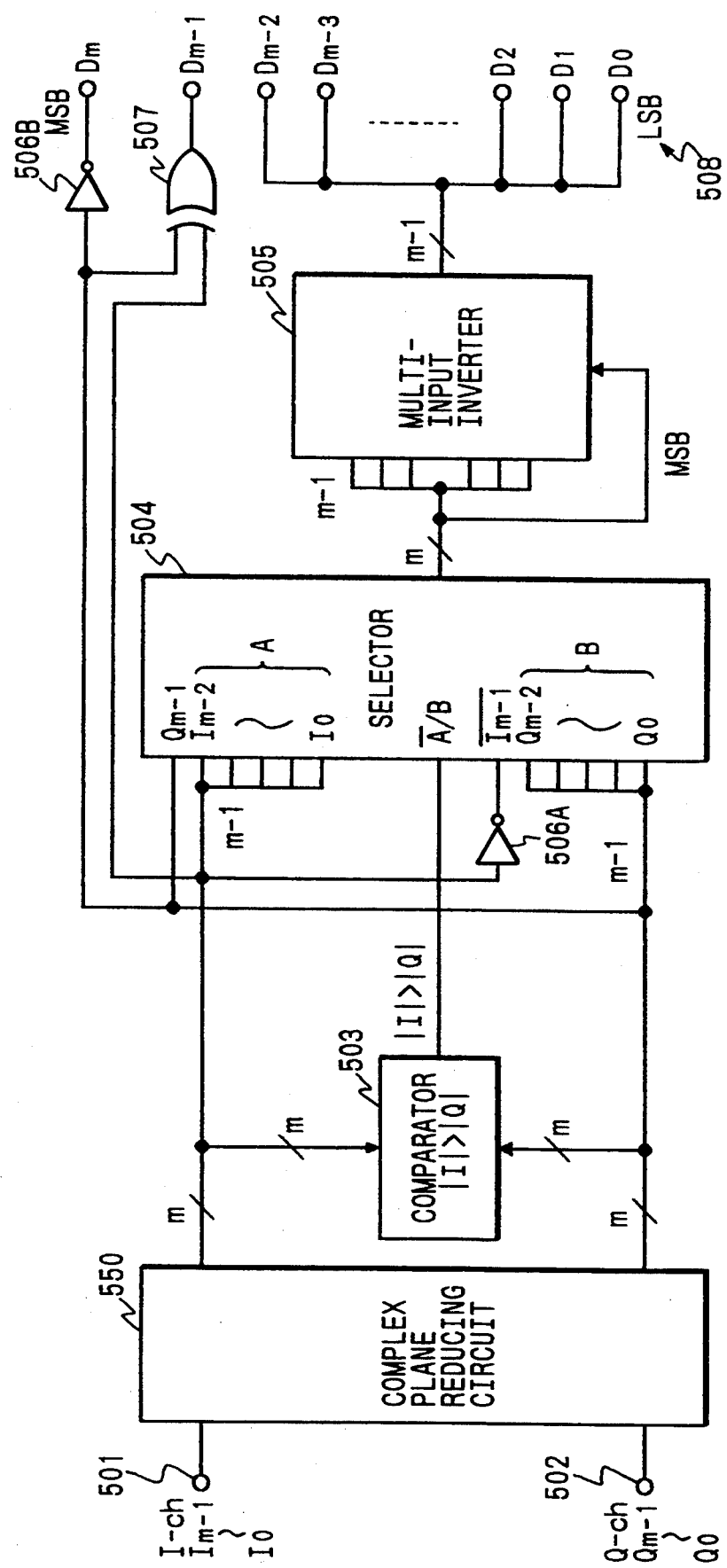
FIG. 17 is a block diagram of a complex angle converter according to a fourth embodiment of this invention.

FIG. 17 shows a fourth embodiment of this invention which is similar to the embodiment of FIGS. 15 and 16 except that a complex-plane reducing circuit 550 is additionally provided. The complex-plane reducing circuit 550 receives an original I-channel signal and an original Q-channel signal, and converts the I-channel signal and the Q-channel signal into a second I-channel signal and a second Q-channel signal. The resultant of the second I-channel signal and the second Q-channel signal is reduced in complex plane relative to the resultant of the original I-channel signal and the original Q-channel signal. The complex-plane reducing circuit 550 outputs the second I-channel signal and the second Q-channel signal to an absolute-value comparator 503 and other circuits.

The resultant of the original I-channel signal and the Q-channel signal tends to move from the ideal envelope "A" or "B" into regions "C" in FIG. 16 due to noise and system imperfections. When the resultant of the original I-channel signal and the Q-channel signal falls into the regions "C", wrong output angle data would usually occur. The complex-plane reducing circuit 550 removes such a problem.

When the resultant of the original I-channel signal and the Q-channel signal exists in the regions "C" in FIG. 16, the complex-plane reducing circuit 550 forces the second I-channel signal and the second Q-channel signal into states corresponding to the points "D" related to the respective regions "C". The points "D" exist on the ideal envelopes "A" and "B". When the resultant of the original I-channel signal and the Q-channel signal exists outside the regions "C" in FIG. 16, the complex-plane reducing circuit 550 sets the second I-channel signal and the second Q-channel signal equal to the original I-channel signal and the original Q-channel signal respectively.

The complex-plane reducing circuit 550 includes, for example, a ROM. Alternatively, the complex-plane reducing circuit 550 includes a logic array.

Figure 27:
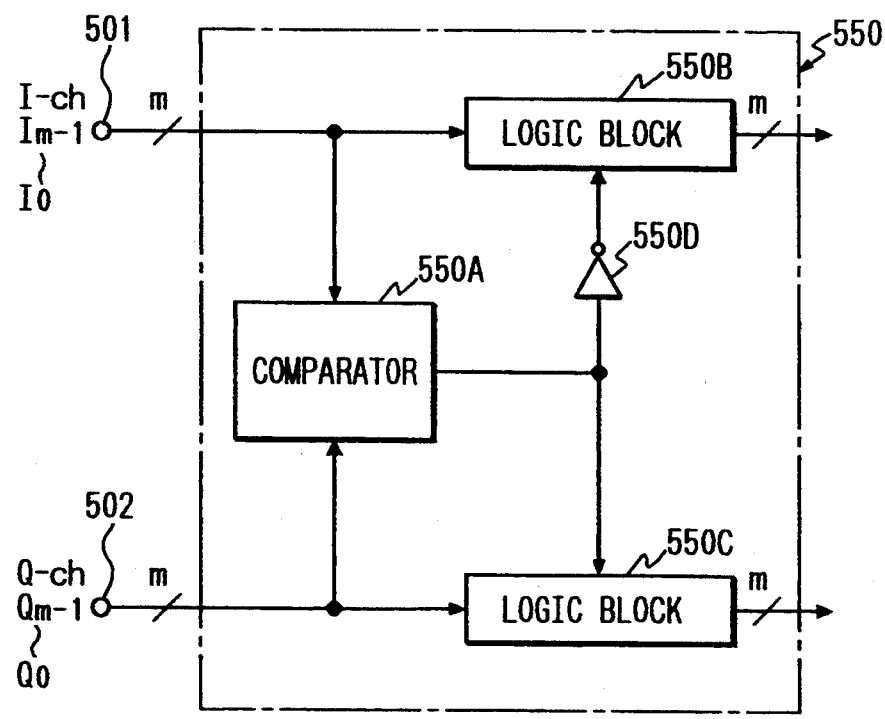
FIG. 27 is a block diagram of the complex-plane reducing circuit in FIG. 17.

FIG. 27 shows an example of the complex-plane reducing circuit 550. As shown in FIG. 27, the complex-plane reducing circuit 550 includes an absolute-value comparator 550A, logic blocks 550B and 550C, and an inverter 550D. It should be noted that the comparator 550A of FIG. 27 and the comparator 203 of FIG. 17 can be composed of a same device.

The comparator 550A receives the original I-channel signal and the original Q-channel signal, and compares the absolute values of the data represented by the original I-channel signal and the original Q-channel signal. The output signal of the comparator 503 which represents the result of the comparison is applied to the input terminal of the inverter 550D and a control terminal of the logic block 550C. The output terminal of the inverter 550D is connected to a control terminal of the logic block 550B.

The logic block 550B receives the original I-channel signal. The logic block 550B is followed by the comparator 503 and other devices (see FIG. 17). The logic block 550B processes the original I-channel signal in response to the output signal of the inverter 550D. When the absolute value $|I|$ of the data of the original I-channel signal is greater than the absolute value $|Q|$ of the data of the original Q-channel signal, the logic block 550B passes the original I-channel signal and outputs the original I-channel signal as the second I-channel signal. When the absolute value $|I|$ of the data of the original I-channel signal is smaller than the absolute value $|Q|$ of the data of the original Q-channel signal and when the states of the highest bit $I_{m-1}$ and the second highest bit $I_{m-2}$ of the original I-channel signal are different from each other, the logic block 550B passes the original I-channel signal and outputs the original I-channel signal as the second I-channel signal. It is now assumed that "m" is equal to six. When the absolute value $|I|$ of the data of the original I-channel signal is smaller than the absolute value $|Q|$ of the data of the original Q-channel signal and when both the states of the highest bit $I_{m-1}$ and the second highest bit $I_{m-2}$ of the original I-channel signal are "0", the logic block 550B outputs the data "010000" as the second I-channel signal. When the absolute value $|I|$ of the data of the original I-channel signal is smaller than the absolute value $|Q|$ of the data of the original Q-channel signal and when both the states of the highest bit $I_{m-1}$ and the second highest bit $I_{m-2}$ of the original I-channel signal are "1", the logic block 550B outputs the data "101111" as the second I-channel signal.

The logic block 550C receives the original Q-channel signal. The logic block 550C is followed by the comparator 503 and other devices (see FIG. 17). The logic block 550C processes the original Q-channel signal in response to the output signal of the comparator 550A. When the absolute value $|I|$ of the data of the original I-channel signal is smaller than the absolute value $|Q|$ of the data of the original Q-channel signal, the logic block 550C passes the original Q-channel signal and outputs the original Q-channel signal as the second Q-channel signal. When the absolute value $|I|$ of the data of the original I-channel signal is greater than the absolute value $|Q|$ of the data of the original Q-channel signal and when the states of the highest bit $Q_{m-1}$ and the second highest bit $Q_{m-2}$ of the original Q-channel signal are different from each other, the logic block 550C passes the original Q-channel signal and outputs the original Q-channel signal as the second Q-channel signal. It is now assumed that "m" is equal to six. When the absolute value $|I|$ of the data of the original I-channel signal is greater than the absolute value $|Q|$ of the data of the original Q-channel signal and when both the states of the highest bit $Q_{m-1}$ and the second highest bit $Q_{m-2}$ of the original Q-channel signal are "0", the logic block 550C outputs the data "010000" as the second Q-channel signal. When the absolute value $|I|$ of the data of the original I-channel signal is greater than the absolute value $|Q|$ of the data of the original Q-channel signal and when both the states of the highest bit $Q_{m-1}$ and the second highest bit $Q_{m-2}$ of the original Q-channel signal are "1", the logic block 550C outputs the data "101111" as the second Q-channel signal.

Figure 28:
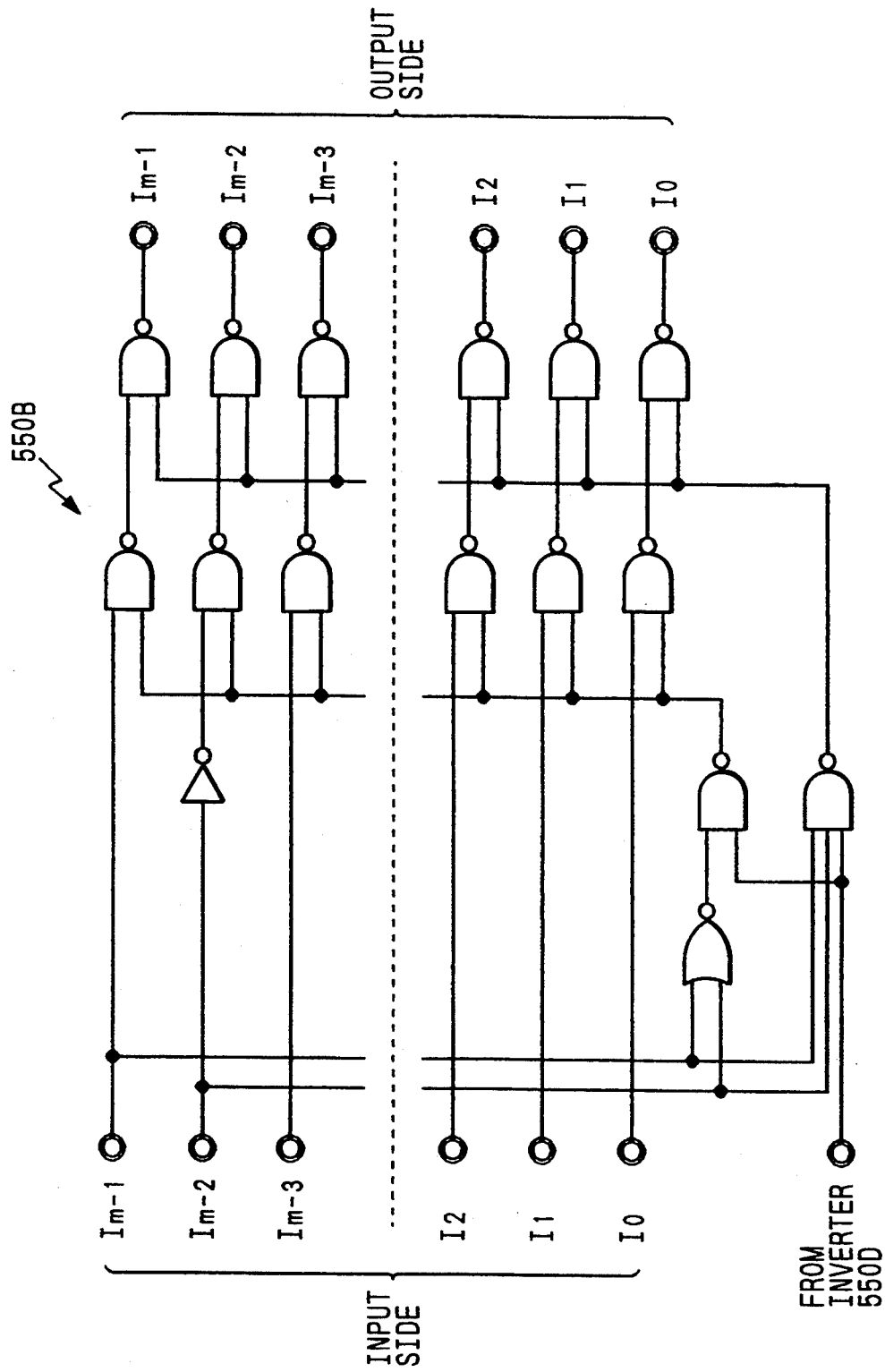
FIGS. 28 and 29 are block diagrams of the logic blocks in FIG. 27.
Figure 29:
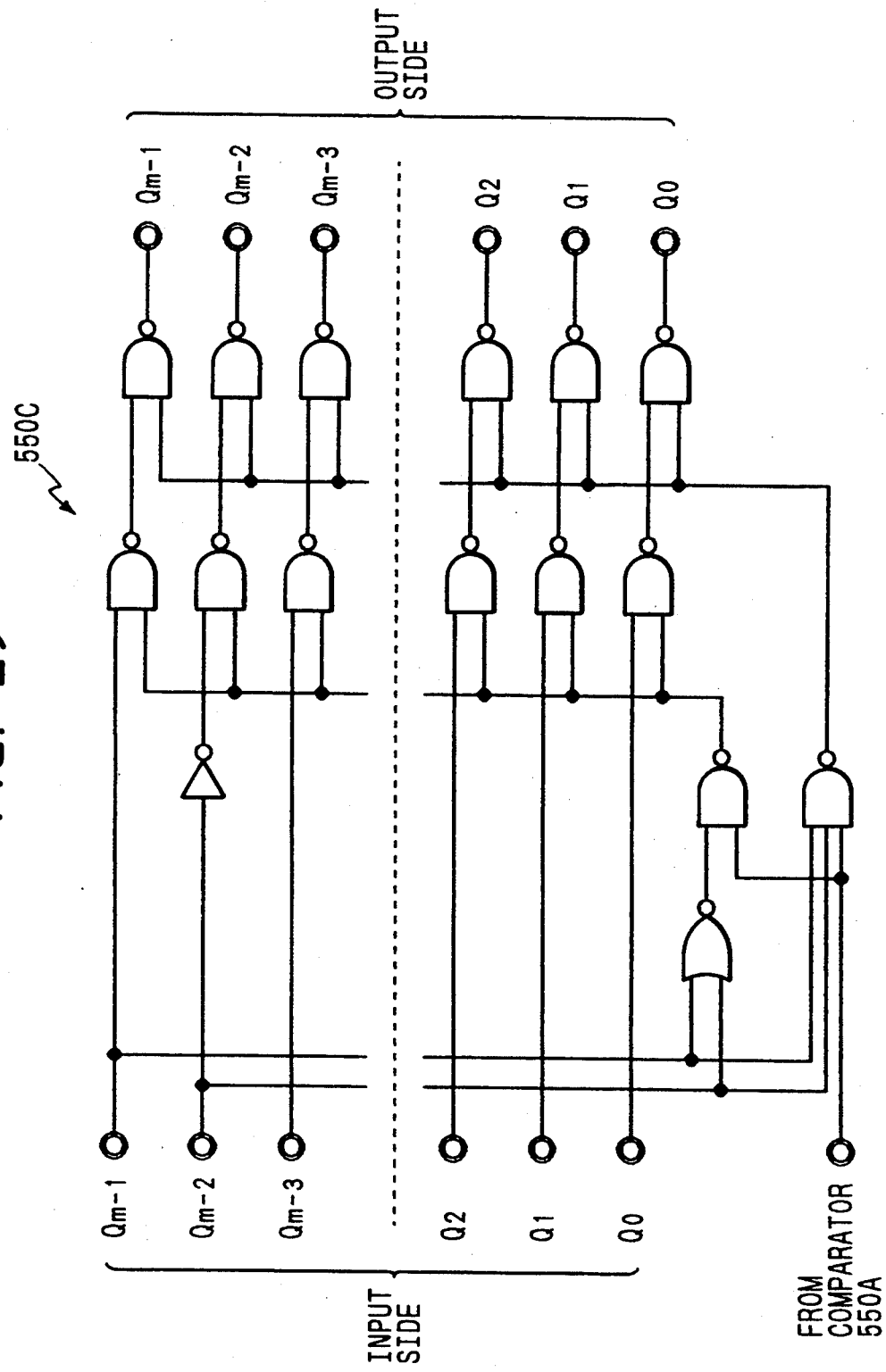

As shown in FIG. 28, the logic block 550B includes a combination of logic operation elements. As shown in FIG. 29, the logic block 550C includes a combination of logic operation elements.

DESCRIPTION OF THE FIFTH PREFERRED EMBODIMENT

Figure 18:
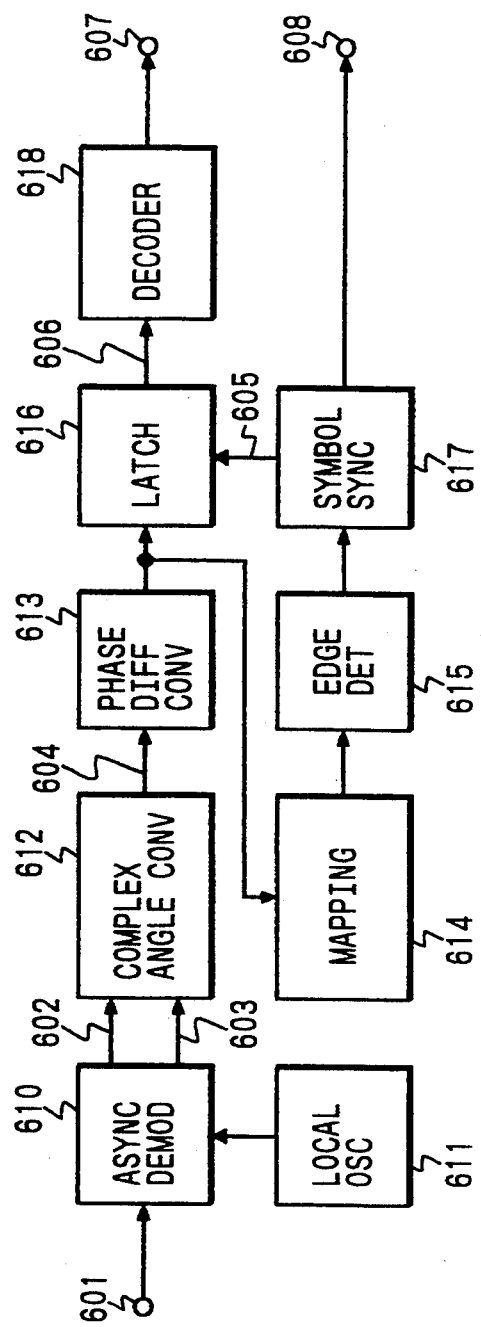
FIG. 18 is a block diagram of a digital modulation signal receiver according to a fifth embodiment of this invention.

With reference to FIG. 18, a receiver for a digital phase modulation signal includes an asynchronous quadrature demodulator 610, a local oscillator 611, a complex angle converter 612, a phase difference converter 613, a mapping circuit 614, an edge detector 615, a latch 616, a symbol sync circuit 617, and a decoder 618.

The demodulator 610 receives an DPSK (differential phase shift keyed) modulated IF signal via an input terminal 601. The demodulator 610 receives an output signal of the local oscillator 611. The demodulator 610 derives an in-phase baseband signal (I-channel signal) 602 and a quadrature baseband signal (Q-channel signal) 603 from the modulated IF signal by referring to the output signal of the local oscillator 611. The combination of the demodulator 610 and the local oscillator 611 corresponds to the combination of the Exclusive-OR circuits 103a and 103b, the frequency divider 110, the phase shifter 105, and the counters 106c and 106d of FIG. 4.

The complex angle converter 612 which follows the demodulator 610 converts the in-phase baseband signal 602 and the quadrature baseband signal 603 into data 604 representing a complex angle (phase) determined by the signals 602 and 603. The complex angle converter 612 can be the complex angle converter of the embodiment of FIG. 15 or FIG. 17.

Figure 19:
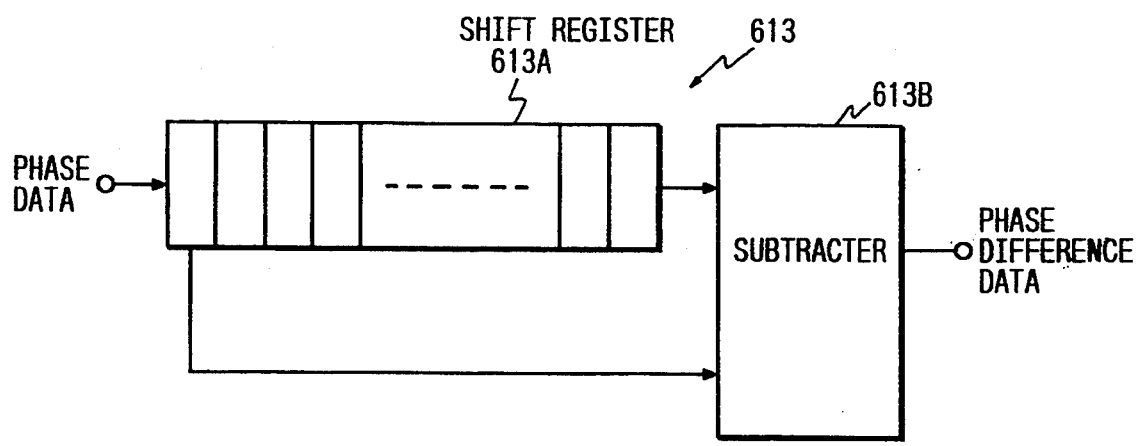
FIG. 19 is a block diagram of the phase difference converter in FIG. 18.

The phase difference converter 613 receives the phase data 604 from the complex angle converter 612. As shown in FIG. 19, the phase difference converter 613 includes a shift register 613A and a subtracter 613B. The phase data 604 is stored into the shift register 613A, and is then periodically shifted through storage segments thereof. The shift register 613A delays the phase data 604 by a 1-symbol period. The shift register 613A outputs delayed phase data to a first input terminal of the subtracter 613B. A second input terminal of the subtracter 613B is subjected to the non-delayed phase data. The subtracter 613B calculates a difference between the delayed phase data and the non-delayed phase data, and generates data representative thereof. The phase difference data is outputted from the subtracter 613B to the mapping circuit 614 and the latch 616.

Figure 20:
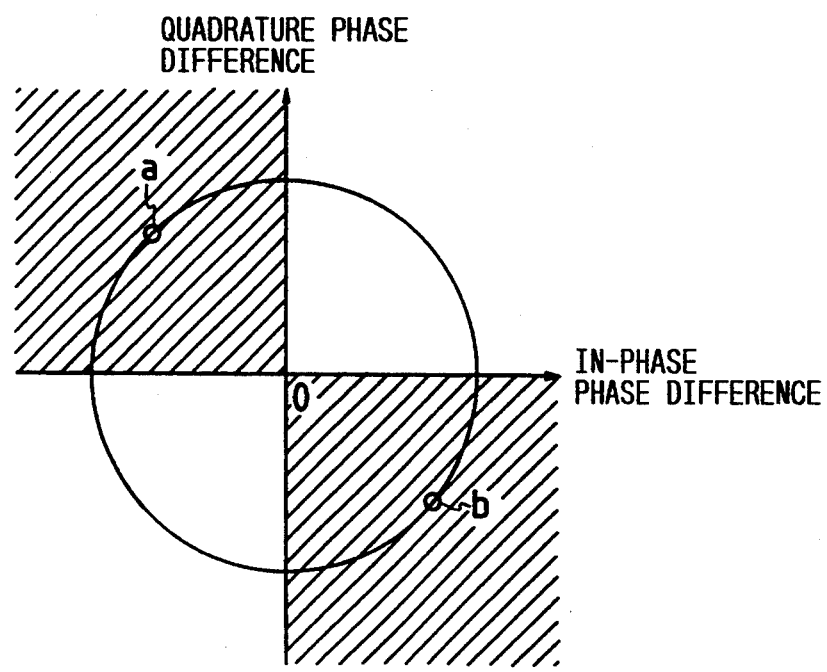
FIG. 20 is a diagram of divided regions in a phase difference plane.

The mapping circuit 614 converts the phase difference data into a binary signal which can assume either "1" or "0". The mapping circuit 614 includes a ROM. In the case of a $\pi/4$-shift DQPSK signal, as shown in FIG. 20, the two-dimensional plane determined by the quadrature phase difference and the in-phase phase difference is divided into four regions assigned to "1" or "0". In FIG. 20, the two hatched regions agree with the regions assigned to "1", and the other two regions are assigned to "0". The boundaries between the four regions correspond to phase differences of 0, $\pi/2$, $\pi$, and $-\pi/2$ respectively. The phase difference data corresponds to a point within the two-dimensional plane of FIG. 20. The mapping circuit 614 outputs data of "1" or "0" in response to which of the four divided regions contains the point of the phase difference data. Thus, the state of the output signal of the mapping circuit 614 depends on which of the four divided regions contains the point of the phase difference data.

Figure 21:
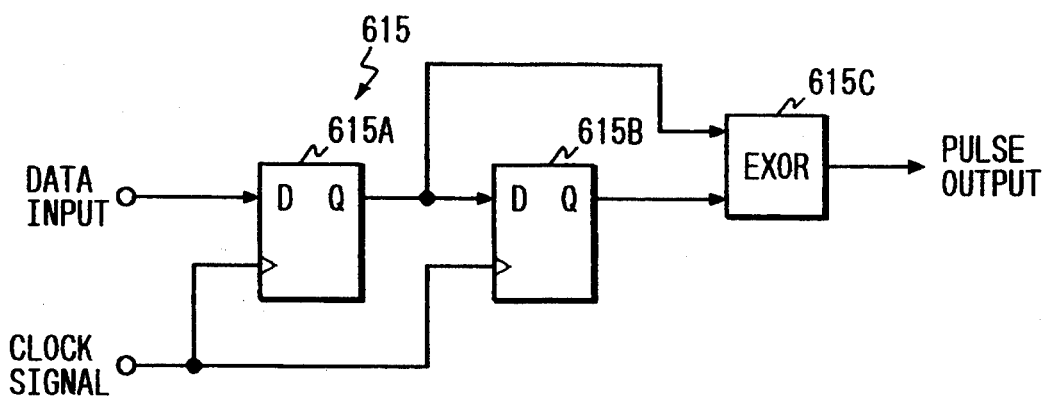
FIG. 21 is a block diagram of the edge detector in FIG. 18.

The edge detector 615 which follows the mapping circuit 614 detects a change in the output signal of the mapping circuit 614. The edge detector 615 outputs a trigger pulse upon the detection of every change in the output signal of the mapping circuit 614. The edge detector 615 includes a differentiating circuit. Specifically, as shown in FIG. 21, the edge detector 615 includes D-type flop-flops 615A and 615B and an Exclusive-OR circuit 615C. The data input terminal of the flip-flop 615A is subjected to the output data of the mapping circuit 614. The output terminal of the flip-flop 615A is connected to the data input terminal of the flip-flop 615B and a first input terminal of the Exclusive-OR circuit 615C. The output terminal of the flip-flop 615B is connected to a second input terminal of the Exclusive-OR circuit 615C. The clock input terminals of the flip-flops 615A and 615C receive an edge detection clock signal from a clock generator (not shown). The flip-flops 615A and 615B execute latching processes in response to the clock signal. The Exclusive-OR circuit 615C executes logic Exclusive-OR operation between the output signals of the flip-flops 615A and 615B, generating the trigger pulse signal.

Figure 22:
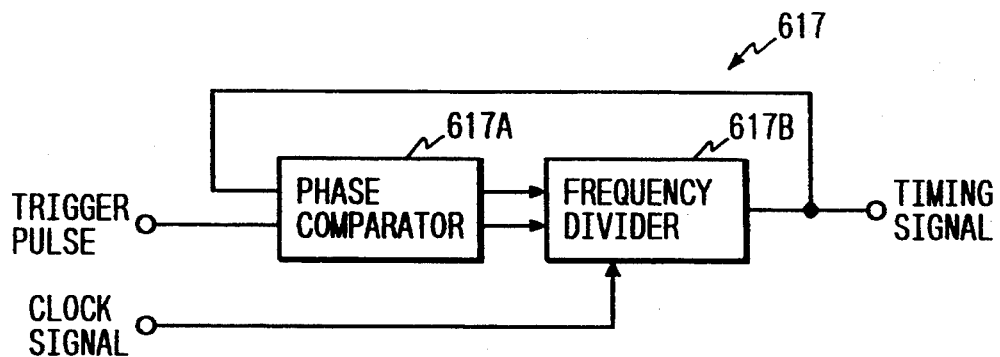
FIG. 22 is a block diagram of the symbol sync circuit in FIG. 18.

The symbol sync circuit 617 which follows the edge detector 615 generates a symbol sync signal in response to the trigger pulse signal outputted therefrom. A trigger pulse occurs at every symbol transition. In addition, the temporal position of a trigger pulse approximately coincides with the center (middle point) between adjacent symbol timings. The symbol sync circuit 617 includes a PLL circuit. Specifically, as shown in FIG. 22, the symbol sync circuit 617 includes a phase comparator 617A and a frequency divider 617B. A first input terminal of the phase comparator 617A receives the trigger pulse signal from the edge detector 615. A second input terminal of the phase comparator 617A receives the output signal of the frequency divider 617B. The phase comparator 617A compares the phases of the trigger pulse signal and the output signal of the frequency divider 617B, and outputs a control signal depending on the result of the phase comparison. The phase comparator 617A outputs the control signal to the frequency divider 617B. The frequency divider 617B receives a high-frequency clock signal from a clock generator (not shown), and divides the frequency of the clock signal by a value depending on the control signal. The frequency divider 617B is controlled in response to the control signal so that trigger pulses can be equal in timing to rising edges in the output signal of the frequency divider 617B. The output signal of the frequency divider 617B is the symbol sync signal which has a period corresponding to the symbol period and which has a duty cycle of 50%. In addition, falling edges in the symbol sync signal coincide with symbol timings. The symbol sync signal generated by the symbol sync circuit 617 is fed to the latch 616.

The symbol sync circuit 617 may further include a section for deriving a bit sync signal from the symbol sync signal. In this case, the bit sync signal is transmitted from the symbol sync circuit 617 to an external device (not shown) via a sync output terminal 608.

The latch 616 periodically samples and holds the phase difference data at timings determined by the symbol sync signal. The decoder 618 which follows the latch 616 decodes the output signal of the latch 616 into corresponding bit data used as recovered bit data. The recovered bit data is transmitted from the decoder 618 to an external device via a data output terminal 607.

DESCRIPTION OF THE SIXTH PREFERRED EMBODIMENT

Figure 23:
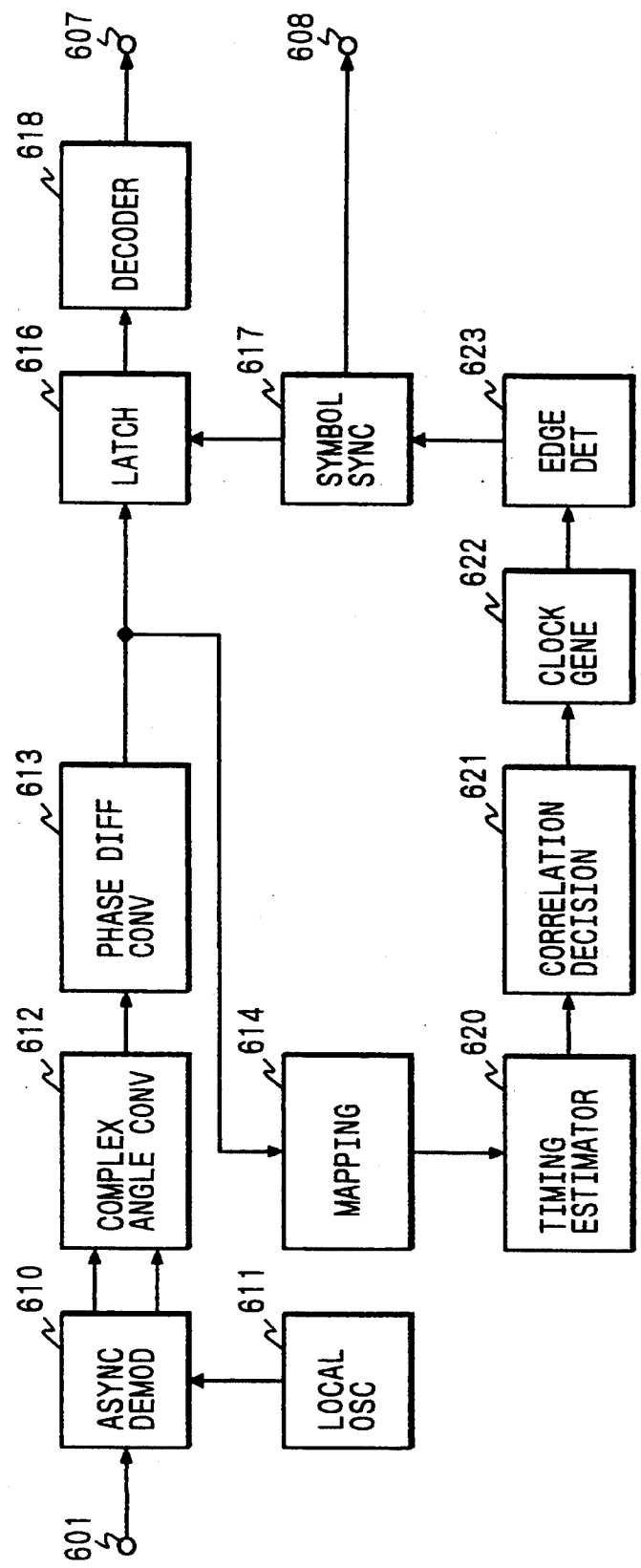
FIG. 23 is a block diagram of a digital modulation signal receiver according to a sixth embodiment of this invention.

FIG. 23 shows a sixth embodiment of this invention which is similar to the embodiment of FIGS. 18-22 except for design changes indicated hereinafter.

The sixth embodiment is applied to digital data communication systems using $\pi/4$-shift DQPSK signals. Specifically, the sixth embodiment is applied to TDMA packet radio communication systems such as digital automobile telephone systems "RCR STD-27" and second-generation cordless telephone systems "RCR STD-28". In these systems, the head of each packet of a transmitted signal has a specified pattern of symbols. The sixth embodiment detects the specified pattern of symbols, and generates a symbol sync signal in response to the detected specified pattern. The specified pattern includes a sequence of first-type symbols and second-type symbols alternating with each other. The first-type symbols correspond to a point "a" in the complex plane of FIG. 20. The second-type symbols correspond to a point "b" in the complex plane of FIG. 20. It should be noted that the complex plane of FIG. 20 is determined by the quadrature phase difference signal and the in-phase phase difference signal.

The embodiment of FIG. 23 includes a timing estimator 620, a correlation decision circuit 621, a clock generator 622, and a one-way edge detector 623 instead of the edge detector 615 of FIG. 18.

Figure 24:
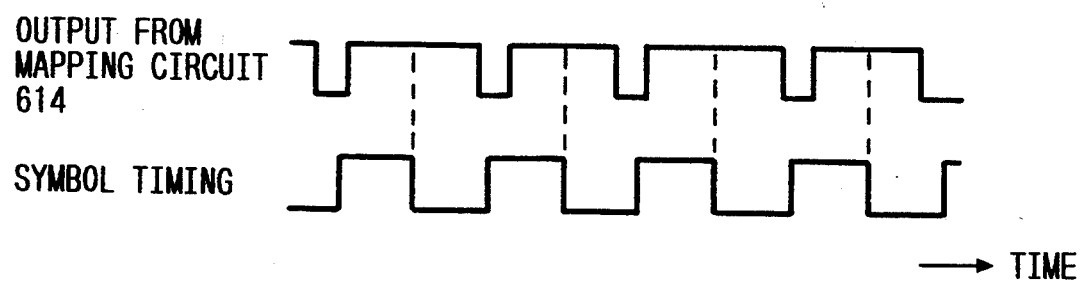
FIG. 24 is a time-domain diagram of the waveform of the output signal from the mapping circuit in FIG. 23 and the waveform of a symbol timing signal.
Figure 25:
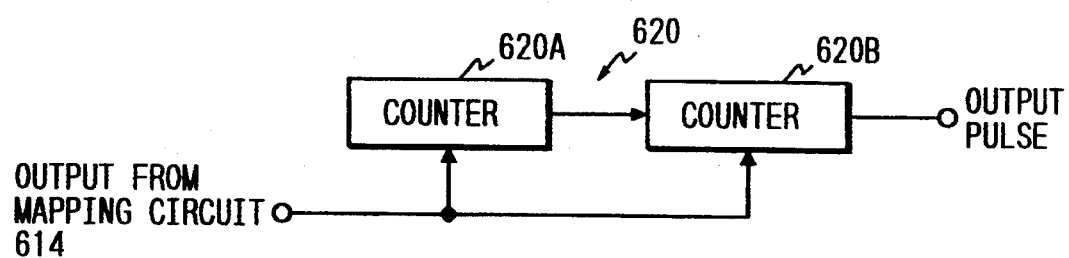
FIG. 25 is a block diagram of the timing estimator in FIG. 23.

The timing estimator 620 follows a mapping circuit 614, and estimates symbol timings by referring to the output signal of the mapping circuit 614. As shown in FIG. 24, during the reception of the specified pattern of symbols, the center (middle point) of every interval during which the output signal of the mapping circuit 614 remains "1" can be regarded as being coincident with a symbol timing. In view of this fact, the timing estimator 620 detects the time points of the previously-mentioned interval centers, and estimates the symbol timings by referring to the detected time points. Specifically, as shown in FIG. 25, the timing estimator 620 includes a combination of counters 620A and 620B which receive the output signal of the mapping circuit 614. During a period for which the output signal of the mapping circuit 614 remains "1", the counter 620A continues to count pulses in a high-frequency clock signal. This operation of the counter 620A enables measurement of the length of the period for which the output signal of the mapping circuit 614 remains "1" The counter 620A outputs a signal to the counter 620B which represents a value equal to the counted pulse number divided by two. Thus, the output signal from the counter 620A to the counter 620B corresponds to the center (middle point) of every interval during which the output signal of the mapping circuit 614 remains "1". When the output signal of the mapping circuit 614 changes from "1" to "0", the counter 620B is loaded with the output signal of the counter 620A. Then, the counter 620B continues to count pulses in the high-frequency clock signal until the counted pulse number reaches a predetermined value corresponding to the symbol period. When the counted pulse number reaches the predetermined value, the counter 620B outputs a pulse. The counter 620B is followed by the correlation decision circuit 621.

Figure 26:
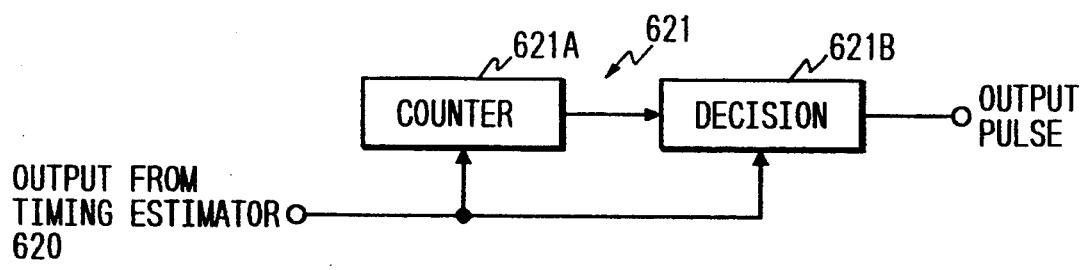
FIG. 26 is a block diagram of the correlation decision circuit in FIG. 23.

The correlation decision circuit 621 determines whether or not the interval between pulses outputted from the timing estimator 620 is good as a symbol period. Specifically, as shown in FIG. 26, the correlation decision circuit 621 includes a counter 621A and a decision section 621B. The counter 621A measures the interval between the output pulses from the timing estimator 620 by counting pulses in a high-frequency clock signal during that interval. The counter 621A outputs a signal to the decision section 621B which represents the measured interval between the output pulses from the timing estimator 620. The decision section 621B includes a comparator and a gate. The comparator compares the output signal of the counter 621A and a signal representing a predetermined reference interval to determine whether or not the interval between the output pulses from the timing estimator 620 is good as a symbol period. The comparator outputs a signal indicating the result of the comparison. The gate operates on the output signal of the timing estimator 620 in response to the output signal of the comparator. The gate is followed by the clock generator 622. When the interval between the current output pulse from the timing estimator 620 and the immediately preceding output pulse therefrom is determined to be good, the current output pulse from the timing estimator 620 is transmitted through the correlation decision circuit 621 to the clock generator 622 as a reset pulse. Otherwise, the transmission of the pulse through the correlation decision circuit 621 is inhibited.

The clock generator 422 includes a counter which generates a symbol clock signal. The counter is reset by every pulse outputted from the correlation decision circuit 621. Thus, the clock generator 422 is restarted at a timing which coincides with the moment of the reception of the reset pulse from the correlation decision circuit 621.

The one-way edge detector 623 which follows the clock generator 422 detects rising edges in the output signal therefrom. The one-way edge detector 623 outputs a trigger pulse upon the detection of every rising edge in the output signal from the clock generator 422. Accordingly, the output signal of the one-way edge detector 623 is a symbol sync signal having a period equal to the symbol period. The one-way edge detector 623 includes a differentiating circuit. The symbol sync signal is fed from the one-way edge detector 623 to a symbol sync circuit 617.

What is claimed is:

1. A quadrature demodulator comprising:
    means for generating first and second reference signals having a quadrature relation with each other;
    first demodulating means for comparing phases of the first reference signal and an input modulated signal to demodulate the input modulated signal into a first binary baseband signal;
    second demodulating means for comparing phases of the second reference signal and the input modulated signal to demodulate the input modulated signal into a second binary baseband signal having a quadrature relation with the first baseband signal;
    first counting means for counting pulses of a clock signal in response to the first baseband signal during a predetermined gating interval, and outputting a signal representative of a result of said counting of the pulses of the clock signal in response to the first baseband signal;
    second counting means for counting pulses of the clock signal in response to the second baseband signal during said predetermined gating interval, and outputting a signal representative of a result of said counting of the pulses of the clock signal in response to the second baseband signal;
    means for generating an address signal in response to the output signals of the first and second counting means; and
    means for generating data representative of an absolute phase of the input modulated signal in response to the address signal, wherein the first counting means comprises:
    data shifting means having a predetermined number of a cascade combination of stages for sequentially shifting the first baseband signal therein in response to the clock signal;
    means for generating a control signal in response to the first baseband signal and an output signal of the data shifting means; and
    an up-down counter for selectively counting up and down pulses of the clock signal in response to the control signal.

2. The quadrature demodulator of claim 1, wherein the second counting means comprises:
    data shifting means having a predetermined number of a cascade combination of stages for sequentially shifting the second baseband signal therein in response to the clock signal;

means for generating a control signal in response to the second baseband signal and an output signal for the data shifting means; and an up-down counter for selectively counting up and down pulses of the clock signal in response to the control signal.

3. The quadrature demodulator of claim 1, further comprising gating interval means for generating a signal indicative of a gating interval to establish said predetermined gating interval, said gating interval means comprising first means for receiving said first and second baseband signals and producing a first signal responsive thereto, and second means responsive to said first signal for generating said signal indicative of said gating interval, wherein said first counting means is responsive to said gating signal and to said first baseband signal for counting the pulses of the clock signal, and said second counting means is responsive to said gating signal and to said second baseband signal for counting the pulses of the clock signal.

4. A quadrature demodulator comprising:

means for generating first and second reference signals having a quadrature relation with each other;

first demodulating means for comparing phases of the first reference signal and an input modulated signal to demodulate the input modulated signal into a first binary baseband signal;

second demodulating means for comparing phases of the second reference signal and the input modulated signal to demodulate the input modulated signal into a second binary baseband signal having a quadrature relation with the first baseband signal;

first counting means for counting pulses of a clock signal in response to the first baseband signal during a predetermined gating interval, and outputting a signal representative of a result of said counting of the pulses of the clock signal in response to the first baseband signal;

second counting means for counting pulses of the clock signal in response to the second baseband signal during said predetermined gating interval, and outputting a signal representative of a result of said counting of the pulses of the clock signal in response to the second baseband signal;

means for generation an address signal in response to the output signals of the first and second counting means; and means for generating data representative of an absolute phase of the input modulated signal in response to the address signal, wherein the first counting means comprises:

a predetermined number of data store devices;

means for sequentially and cyclically distributing the first baseband signal to the data store devices;

means for sequentially and cyclically transmitting data from the data store devices to a common terminal;

means for generating a control signal in response to the first baseband signal and the data transmitted to the common terminal; and an up-down counter for selectively counting up and down pulses of the clock signal in response to the control signal.

5. The quadrature demodulator claim 4, wherein the second counting means comprises:

a predetermined number of data store devices;

means for sequentially and cyclically distributing the second baseband signal to the data store devices;

means for sequentially and cyclically transmitting data from the data store devices to a common terminal;

means for generating a control signal in response to the second baseband signal and the data transmitted to the common terminal; and an up-down counter for selectively counting up and down pulses of the clock signal in response to the control signal.

6. The quadrature demodulator of claim 4, further comprising gating interval means for generating a signal indicative of a gating interval to establish said predetermined gating interval, said gating interval means comprising first means for receiving said first and second baseband signals and producing a first signal responsive thereto, and second means responsive to said first signal for generating said signal indicative of said gating interval, wherein said first counting means is responsive to said gating signal and to said first baseband signal for counting the pulses of the clock signal, and said second counting means is responsive to said gating signal and to said second baseband signal for counting the pulses of the clock signal.

* * * * *